US007042963B1

(12) United States Patent
Raith et al.

(10) Patent No.: US 7,042,963 B1
(45) Date of Patent: May 9, 2006

(54) METHODS AND APPARATUS FOR DECODING VARIABLY-CODED SIGNALS BASED ON PRIOR COMMUNICATION

(75) Inventors: Alex Krister Raith, San Diego, CA (US); Ayman Mostafa, Cary, NC (US)

(73) Assignee: Ericsson Inc., Plano, TX (US)

( * ) Notice: Subject to any disclaimer, the term of this patent is extended or adjusted under 35 U.S.C. 154(b) by 946 days.

(21) Appl. No.: 09/451,208

(22) Filed: Nov. 29, 1999

Related U.S. Application Data

(60) Provisional application No. 60/111,876, filed on Dec. 11, 1998.

(51) Int. Cl.
*H04L 27/06* (2006.01)

(52) U.S. Cl. ...................................... 375/341
(58) Field of Classification Search ................ 375/149, 375/316, 343, 342, 368, 366, 341, 340, 365, 375/362, 354, 144
See application file for complete search history.

(56) References Cited

U.S. PATENT DOCUMENTS

| | | | | |
|---|---|---|---|---|
| 5,230,003 A | * | 7/1993 | Dent et al. | 714/762 |
| 5,453,997 A | | 9/1995 | Roney, IV | 371/41 |
| 5,671,255 A | | 9/1997 | Wang et al. | 375/341 |
| 5,729,557 A | | 3/1998 | Gardner et al. | 371/41 |
| 5,757,813 A | | 5/1998 | Raith | 371/5.5 |
| 6,112,325 A | * | 8/2000 | Burshtein | 714/774 |

FOREIGN PATENT DOCUMENTS

EP  0 924 890 A2  6/1999

OTHER PUBLICATIONS

International Search Report, PCT/US99/28671, Jun. 13, 2000.

* cited by examiner

*Primary Examiner*—Pankaj Kumar
(74) *Attorney, Agent, or Firm*—Myers Bigel Sibley & Sajovec PA

(57) ABSTRACT

A signal representing variably coded information, i.e., information that is coded according to a code selected from a set of codes, is received at a first station. The received signal is decoding according to respective codes of the set of codes to generate respective likelihood metrics associated with respective codes of the set of codes. A code is selected from the set of codes based on the respective likelihood metrics, wherein the selection of the code from the set of codes is biased based on a prior communication between the first station and a second station that transmitted the signal. The received signal is the decoded according to the selected code to generate an estimate of the information. According to another embodiment, a signal representing a first variably code field and a second field that indicates the code applied to the first field, is received and processed to generate an estimate of the second field. Based on a confidence in the generated estimate of the second field, the receiving station either identifies the code applied to the first field based solely on the generated estimate of the second field, or identifies the code applied to the first field based on the generated estimate of the second field and respective likelihood metrics associated with decoding the received signal according to respective codes of the set of codes. In still another embodiment, an extent to which to partially decode a received variably coded signal to identify the code applied to the signal is determined based on a prior communication between the receiving station and a station that transmitted the signal.

65 Claims, 14 Drawing Sheets

| SYNC | CDFT/ CSFP | PCF | DATA | RAMP |

FIG. 3
Prior Art

| SYNC | CDFT / CSFP | PCF | DATA | P | DATA | P | DATA | P | DATA | P | R |

FIG. 4
Prior Art

| G | R | PREAM | SYNC | CDFT | DATA |

FIG. 5
Prior Art

| G | R | PRE | SYNC | CDFT | DATA | P | DATA | P | DATA | P | DATA | P |

FIG. 6
Prior Art

METHODS AND APPARATUS FOR DECODING VARIABLY-CODED SIGNALS BASED ON PRIOR COMMUNICATION

RELATED APPLICATIONS

This application claims the benefit of U.S. Provisional Application No. 60/111,876, filed Dec. 11, 1998, the disclosure of which is incorporated herein by reference in its entirety.

BACKGROUND OF THE INVENTION

The present invention relates to communications methods and apparatus, and more particularly, to communications methods and apparatus in which signals are encoded according to codes such as modulation and channel codes.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Many wireless systems transmit information using variable encoding schemes in which transmitted information is coded, e.g., modulated and/or channel coded, using a code that is dependent on the nature of the information being transmitted. For example, in systems conforming to the GSM standards, provision is made for signaling within the same bandwidth or payload space as normally used for speech. This signaling channel is denoted the fast associated control channel (FACCH), and is operated in a "blank and burst" fashion. In parallel to the FACCH signaling channel there may also be a signaling channel that is sent outside the payload space for speech, denoted the slow associated control channel (SACCH). In order to save bandwidth, the bit rate of the SACCH typically is relatively low. The FACCH typically can be operated at a higher data rate, as all the voice payload space is typically used. However, transmission of the FACCH will blank the speech signal at times.

A mechanism for indicating whether a data block contains speech or FACCH signaling has been provided in the GSM protocol. A data block corresponding to 20 ms of speech is interleaved over 8 slots. Each slot contains a synchronization word, which is located in the middle of the slot. One bit immediately preceding the syncword and one bit immediately following the syncword is assigned to be the indication of the type of payload, i.e., speech or FACCH. As there are 8 slots for each block of data that either entirely contains speech or entirely contains FACCH signaling, there are in total 16 bits for the voice/signaling detection. The mobile station will typically make a majority decision based on the voice/signaling indication bits (the "stealing flag" (SF)). If the payload is being used for speech, all the bits of the SF are set to zero, and if a FACCH is being transmitted, all the bits of the SF are set to one, thus coding two-valued information ("speech" or FACCH) according to a (16,1) code.

This coding and interleaving can provide increased reliability when operating over an error prone radio channel. If frequency hopping is enabled, each slot will be received with in the best case independent Rayleigh fading, which can improve the detection performance of the SF at low vehicular speed.

When designing IS-54, the idea of using stealing flags was rejected. In IS-54, each 20 ms speech segment is only interleaved over two slots, and there is no provision for frequency hopping. In order to achieve performance in IS-54 that is comparable to the performance provided by SF signaling in GSM, the amount of redundancy (coding) would tend to relatively large, potentially reducing the payload and providing a less than desirable speech coder rate.

Instead of using a stealing flag, the discrimination between speech and FACCH for IS-54 is typically performed by examining the payload. For example, U.S. Pat. No. 5,230,003 to Dent et al. describes a technique for determining whether speech or FACCH signaling is sent by exploiting the difference in channel coding of these two signals. Another alternative is to decode according to both hypotheses and then examine the cyclic redundancy code (CRC) check result for both decoding results, as both the speech frame and the FACCH signaling frame are typically CRC coded before channel coding to allow the receiver to verify whether its demodulation and decoding processes resulted in correct recovered data.

The technique described in the aforementioned U.S. Pat. No. 5,230,003 allows the receiver to make a decision about which hypothesis is most likely before the full frame is decoded, thus potentially reducing complexity. If no CRC fields or SFs are provided, this technique may be the only option for determining the coding of a variably coded signal. For example, this may be the only viable technique for differentiating amongst a plurality of speech and signaling signals in the TIA/EIA IS-95 technology.

The current proposal for the Medium Access Layer (MAC) and Physical Layer protocol for packet data in ANSI 136 (referred to as "MANGO") allows the transmitter to change the modulation and channel coding for each transmitted slot. If channel conditions are favorable, the least amount of redundancy (coding) and the modulation type with the highest constellation point (bits/symbol) preferably is selected. Depending on channel conditions for a specific receiver, the transmitter can select the mode (coding & modulation) to achieve the highest number of net bits in a slot for the given channel condition which produces a desired level of accurate transmission. The receiver typically determines for each received slot (or burst) which mode the transmitter is using.

U.S. Pat. No. 5,757,813 to Raith describes provision of variable coding (modulation and channel coding) for a packet data operation. Two methods of signaling the coding used are described. A separate field indicating the current coding may be provided outside of the field carrying the payload in each slot. This field typically has a predetermined format, including channel coding format and modulation type. Once this field is recovered at the receiver, the rest of the slot can then be decoded based on the information in this field. Another approach involves providing respective different syncwords for respective ones of the coding modes. The receiver correlates or compares the received waveform during the time of the syncword with each possible candidate syncword. The candidate syncword exhibiting the greatest correlation provides an indication to the receiver which coding is applied to the payload-bearing part of the slot.

The first technique described above, i.e., providing a separate field indicating the coding, has been proposed for MANGO. FIGS. 3–6 illustrate respective slot formats for different modulations ($\pi/4$-DQPSK and 8-PSK) on downlink and uplink channels. Referring to FIGS. 3–4, the downlink slot format includes synchronization SYNC, coded data frame type/coded superframe phase (CDFT/CSFP) and packet data channel feedback (PCF) fields. The CDFT field includes three data frame type (DFT) bits that indicate the modulation and channel coding. The DFT information, together with five-bit superframe phase (SFP) information, is encoded in a (12,8) code, i.e., the eight information bits are protected by four check bits. In the uplink, as shown in FIGS. 5–6, the DFT information is sent separately from the superframe phase SFP information. Three bits of information of DFT information is encoded into a (6,3) code, i.e. 3 redundancy bits are added to the 3 bits of information.

The second technique described above, i.e., using variable sync words, is used in the Enhanced Data Rate for Global Evolution (EDGE) physical layer protocol of the GSM-based packet data set of protocols known as General Packet Radio Service (GPRS). In EDGE, respective first and second syncwords are used to indicate whether a current "block" is transmitted with 8PSK or with GMSK modulation. A receiver receiving such a signal may correlate the received signal with two candidate syncwords, and use the correlation results to determine which demodulation to apply to further process the data in each block. Similar to GSM speech, a block constitutes four slots.

If a coding indication field outside of the payload is used, improper decoding may be applied if this coding indication field is incorrectly recovered. An error check, e.g., a CRC check, may be conducted after demodulation and channel decoding. If an error has been made regarding the actual coding applied, this check can indicate an erroneously received frame. In some systems, an automatic repeat request (ARQ) protocol can then cause re-transmission of the corrupted frame. However, re-transmission of frames may result in lower net data throughput and increased delay of delivering the payload. Thus, erroneous decoding the signaling field may have a negative effect on performance.

Referring to the above-described MANGO example, when decoding the CDFT field, the SFP information is typically known to the receiver. Thus, the (12,8) code can be effectively treated as a (7,3) code, allowing improved CDFT decoding performance. An example of a decoding process that takes benefit of a known SFP value is described in the aforementioned U.S. Pat. No. 5,751,731. However, even if such an enhanced decoding technique is used, the error performance in decoding the DFT information may be unsatisfactory.

FIG. 7 illustrates results of a simulation run for a non-dispersive Rayleigh channel for a vehicle speed of 8 km/hr at a frequency of 900 MHz. The simulation assumes a perfect Nyquist condition, the x-axis represents the carrier to noise ratio, and the y-axis represents the word error rate (WER) of an equivalent (7,3) Hamming code. The shortened (7,3) Hamming code is capable of correcting one error bit. For statistical simulation, a word error is declared if the number of errors exceed the error correction capability of the code, i.e., in this case, a word error is declared in error if more than one bit error is detected. Hard decision decoding is used for the demodulation, although soft decision decoding could result in slightly better performance. FIG. 7 shows that for the channel conditions of interest, the DFT is incorrectly decoded with a probability of about 1–10%. Thus, about 1–10% of the frames may need to be retransmitted, which may result in a commensurate reduction in throughput.

SUMMARY OF THE INVENTION

According to an aspect of the present invention, improved decoding of variably coded signals can be achieved using a code selection process that is biased based on information derived from prior communications between the station receiving the variably coded signal and the station transmitting the variably coded signal. This biasing in the code selection process may arise, for example, from biasing a decision criterion by which a code is selected from a set of possible codes based on information derived from prior communication. The code selection process may also be biased by using knowledge of prior communication to determine the extent to which a received signal is partially decoded according to each of the possible codes to generate likelihood metrics to which such a decision criterion is applied. The information derived from prior communication may include, for example, channel quality measures such as CRC check results, error rate estimates, or the like, as well as information that enables the receiving station to predict behavior of the transmitting station, such as knowledge of ARQ status messages transmitted to the transmitting station or knowledge of codes used to encode previously transmitted signals.

According to a preferred embodiment of the present invention, a code selected from the set of codes based on respective likelihood metrics generated by partially decoding a received variably code signal according to respective ones of the possible codes, with the selection being biased based on information derived from prior communication. According to another aspect of the present invention, the extent to which the received signal is decoded is determined based on information derived from prior communication. According to yet another aspect of the present invention, the received signal represents a variably coded field and a coding indication field that indicates the coding applied to the variably coded field. An estimate of the coding indication field is generated from the received signal and, based on a level of confidence in the estimate, the received signal is decoding according to a code selected based either solely on the generated estimate of the coding indication field, or on a combination of the estimate of the coding indication field and respective likelihood metrics generated by partially decoding the received signal according to respective ones of the possible codes by which the variably coded field may have been coded.

Biasing the code selection process based on prior communication allows the present invention to provide improved performance by tailoring the code selection process to actual conditions, such as channel quality and expected behavior patterns of the transmitting station. Adaptively determining the extent to which the received signal is partially decoded according to the candidate codes can obviate the need to compare likelihood metrics on an iteration-by-iteration basis during the partial decoding process without creating undue computational burdens, as a desired decoding length can be predetermined based on factors, such as channel quality measures and ARQ status messages, that are already generated as part of the communications process.

In particular, according to one embodiment of the present invention, a signal representing information coded according to a code selected from a set of codes is received at a first station. The received signal is decoding according to respective codes of the set of codes to generate respective likelihood metrics associated with respective codes of the set of codes. A code is selected from the set of codes based on the respective likelihood metrics, wherein the selection of the code from the set of codes is biased based on a prior communication between the first station and a second station that transmitted the signal. The received signal is the decoded according to the selected code to generate an estimate of the information.

The selection of the code may be biased on a measure of quality for a channel over which the signal is communicated based on a communication between the first and second stations, such as an error indication, a CRC check result, an error rate estimate, or a signal to noise ratio. The code selection may also be biased based on behavior-predicting information gained from prior communication, for example, such as from communications status report (e.g., an ARQ status message) that is communicated between the first and second stations, or from knowledge of the state of a communications transaction between the first and second stations.

According to another embodiment of the present invention, a signal representing a first field and a second field, wherein the first field is coded according to a code selected from a set of codes and the second field indicates the code applied to the first field, is received at a first station. The received signal is processed to generate an estimate of the second field. Based on a confidence in the generated estimate of the second field, the first station either identifies the code applied to the first field based solely on the generated estimate of the second field, or identifies the code applied to the first field based on the generated estimate of the second field and respective likelihood metrics associated with decoding the received signal according to respective codes of the set of codes. The first station then decodes the received signal according to the identified code to produce an estimate of the first field. The selection of the code can be biased according to information derived from prior communication, such as channel quality information, transaction state information, and the like. The extent to which the received signal is partially decoded can also be determined based on such information.

According to another embodiment of the present invention, a signal representing information coded according to a code selected from a set of codes is received at a first station. An extent to which to decode the received signal is determined based on a prior communication between the first station and a second station that transmitted the signal. The received signal is then decoded according to respective codes of the set of codes to the determined extent to generate respective likelihood metrics associated with respective codes of the set of codes. A code is then selected from the set of codes based on the respective likelihood metrics, and the received signal is decoded according to the selected code to generate an estimate of the information. The extent to which the received signal is decoded according to the respective possible codes may be determined based on such information as channel quality measures, information on the state of a communications transaction, and status reports such as ARQ status messages.

According to another aspect of the present invention, a wireless station includes a receiver that receives a signal representing information coded according to a code selected from a set of codes, that decodes the received signal according to respective codes of the set of codes to generate respective likelihood metrics associated with respective codes of the set of codes, that selects a code from the set of codes based on the respective likelihood metrics, and that decodes the received signal according to the selected code to generate an estimate of the information, wherein the selection of the code from the set of codes is biased based on prior communication between the wireless station and a station that transmitted the signal. The receiver may include a code selector circuit that decodes the received signal according to respective codes of the set of codes to generate respective likelihood metrics associated with respective codes of the set of codes and that selects a code from the set of codes based on the respective likelihood metrics, wherein the selection of the code from the set of codes is biased based on a prior communication between the wireless station and the station that transmitted the signal. The receiver may also include a variable decoder that decodes the received signal according to the selected code to generate an estimate of the information.

According to another embodiment of the present invention, a wireless station for processing a signal representing a first field and a second field, the first field coded according to a code selected from a set of codes and the second field indicating the code applied to the first field, includes a code selector circuit that processes the signal to generate an estimate of the second field. The code selector circuit is operative, responsive to a confidence in the generated estimate of the second field, to identify the code applied to the first field based solely on the generated estimate of the second field, or to identify the code applied to the first field based on the generated estimate of the second field and respective likelihood metrics associated with decoding the received signal according to respective codes of the set of codes. A variable decoder is responsive to the code selector circuit and decodes the signal according to the identified code to produce an estimate of the first field.

In yet another embodiment of the present invention, a wireless station for processing a signal representing information coded according to a code selected from a set of codes, includes a receiver that receives the signal, that determines an extent to which to decode the received signal based on a prior communication between the wireless station and a station that transmitted the signal, that decodes the received signal according to respective codes of the set of codes to the determined extent to generate respective likelihood metrics associated with respective codes of the set of codes, that selects a code from the set of codes based on the respective likelihood metrics, and that decodes the received signal according to the selected code to generate an estimate of the information. The receiver may include a code selector circuit that determines an extent to which to decode the received signal based on a prior communication between the wireless station and the station that transmitted the signal, that decodes the received signal according to respective codes of the set of codes to the determined extent to generate respective likelihood metrics associated with respective codes of the set of codes, and that selects a code from the set of codes based on the respective likelihood metrics. A variable decoder is responsive to the code selector circuit and decodes the received signal according to the selected code to generate an estimate of the information.

BRIEF DESCRIPTION OF THE DRAWINGS

FIGS. 3–6 illustrate exemplary uplink and downlink slot formats utilized in a MANGO system.

DETAILED DESCRIPTION

Figure 1:
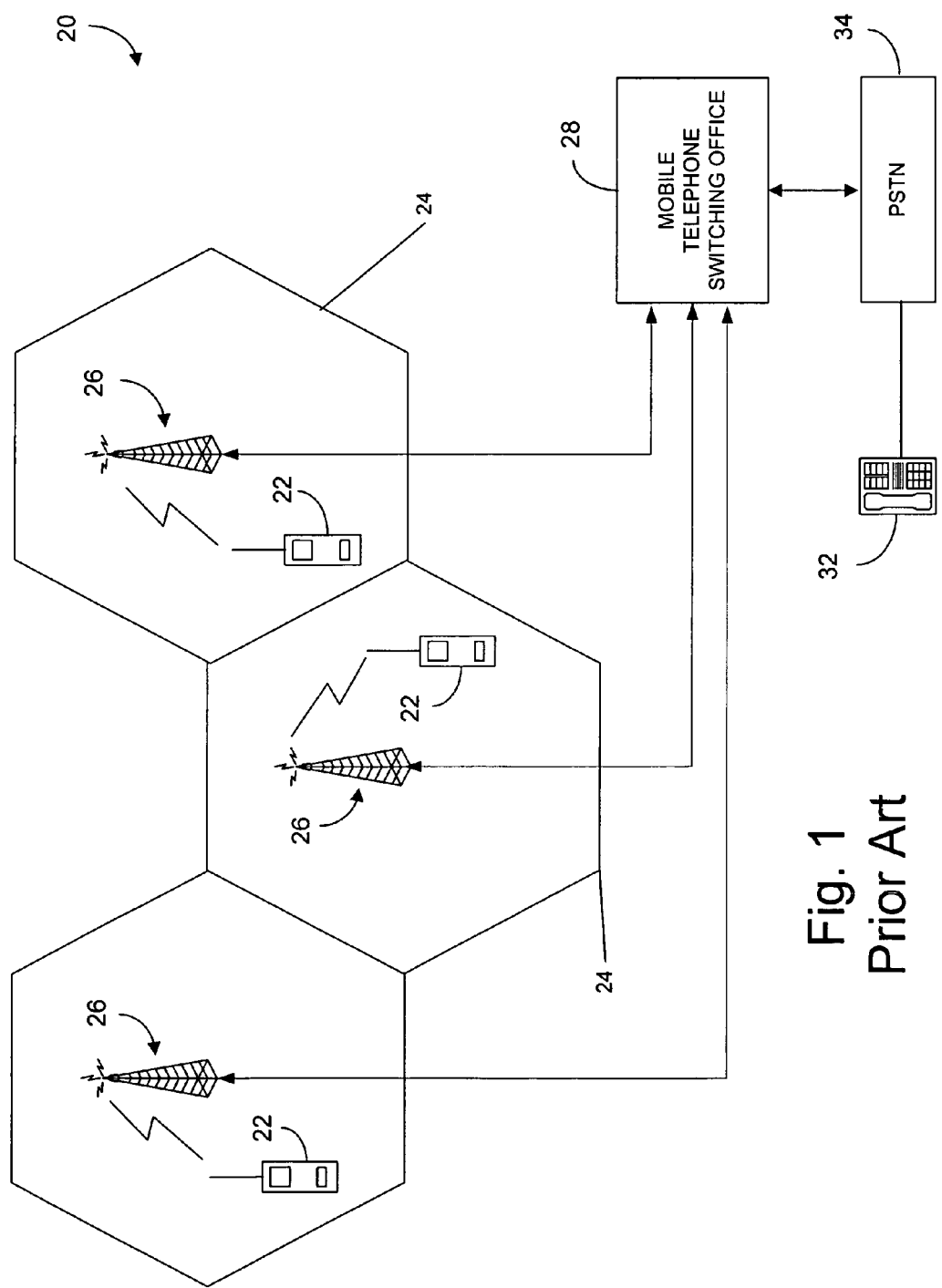
FIG. 1 is a schematic diagram illustrating a conventional terrestrial cellular communications system.
Figure 2:
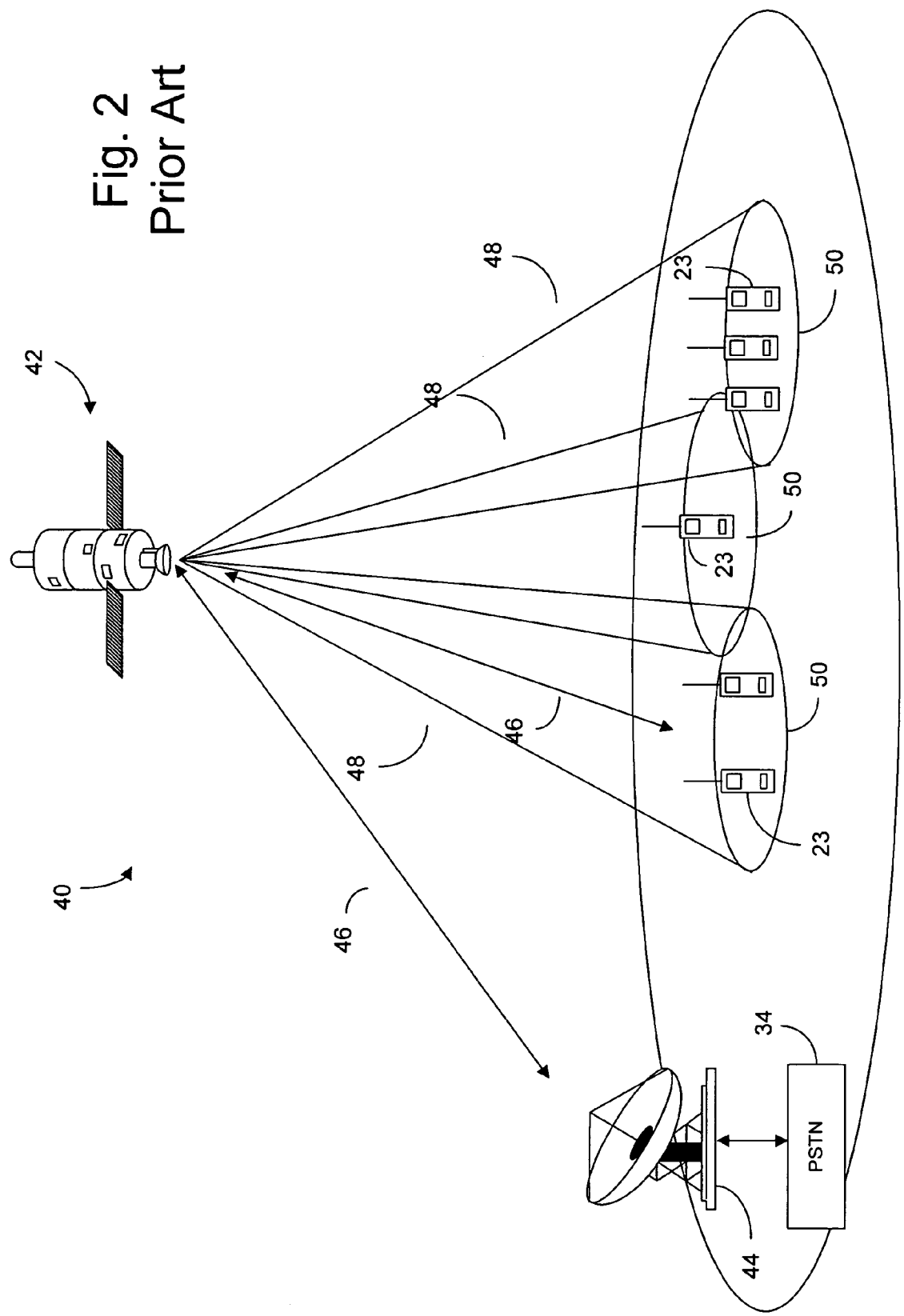
FIG. 2 is a schematic diagram illustrating a conventional satellite based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Although the exemplary embodiments described herein relate to wireless stations such as wireless terminals, it will be appreciated that the present invention is also applicable to other communications systems and apparatus, such as wireline and fiber optic communications systems and apparatus. It will be understood that "variable coding" as used herein refers to coding of various forms including, but not limited to, "modulation coding" (e.g., coding that maps one or more bits to a signal of a signal set) and "channel coding" (e.g., coding that maps sets of bits to other sets of bits). It will also be understood that the present invention is applicable to communications systems in which variably decoded signals are transmitted with or without explicit code identification channels. For example, although the present invention is applicable to systems that provide in-band or out-of-band indication of the coding applied to a variably-coded signal, such as the EDGE and MANGO systems described above, the present invention is also applicable to systems that provide variable decoding on a "blind" basis, i.e., without such an explicit coding indication.

Figure 8:
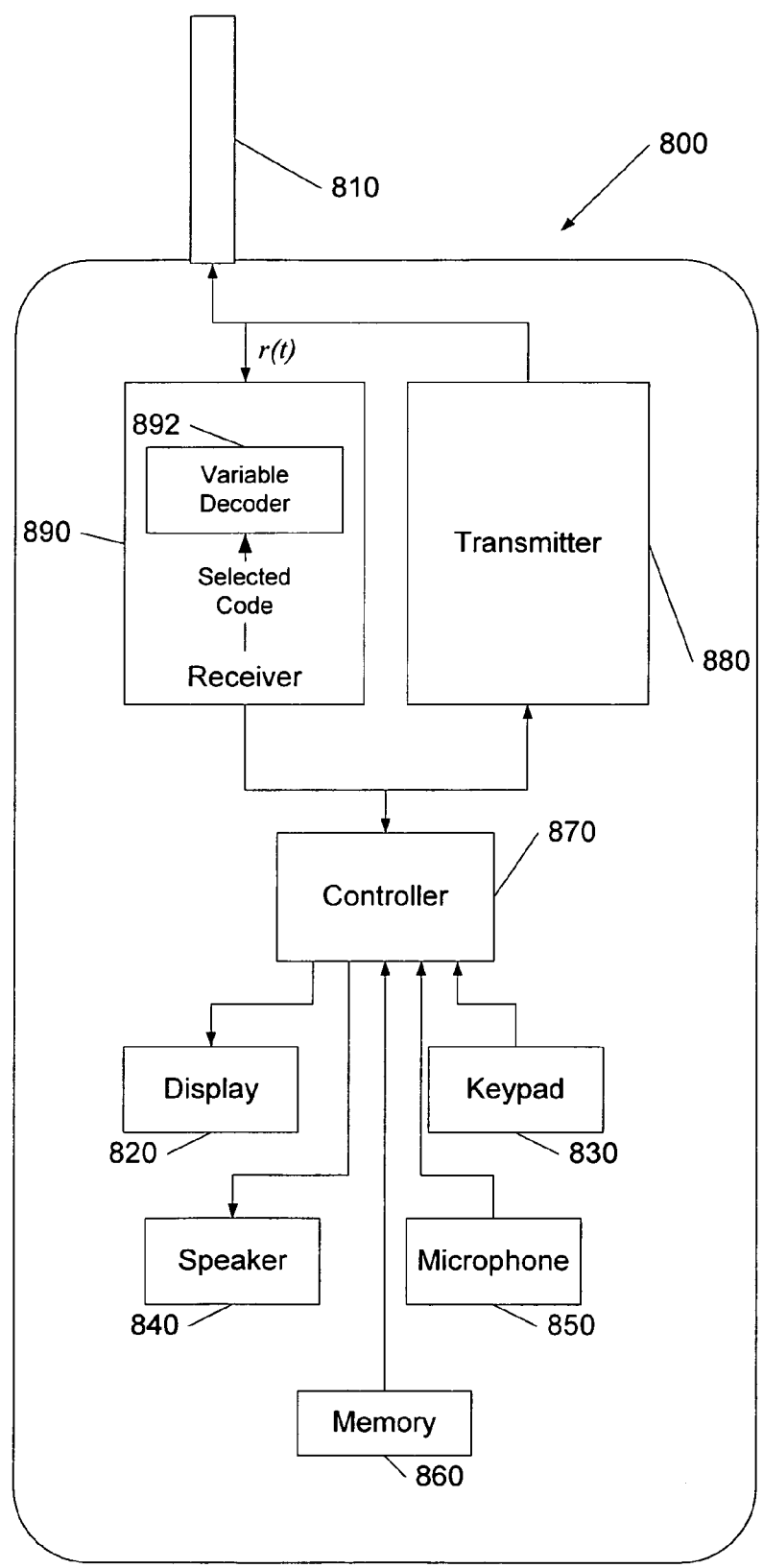
FIG. 8 is a schematic diagram illustrating a wireless terminal according to an embodiment of the present invention.

FIG. 8 illustrates an exemplary wireless terminal 800, e.g., a terminal for use in a wireless communications system, according to one embodiment of the present invention. The terminal 800 includes a controller 870, such as a microprocessor, microcontroller or similar data processing device, that executes program instructions stored in a memory 860 of the terminal 800, such as a dynamic random access memory (DRAM), electrically erasable programmable read only memory (EEPROM) or other storage device. The controller 870 is operatively associated with user interface components of the terminal 800 such as a display 820, keypad 830, speaker 840, and microphone 850, operations of which are known to those of skill in the art and will not be further discussed herein. The terminal 800 also includes a transmitter 880, which is operatively associated with the controller 870, and which transmits radio frequency (RF) signals in a communications medium via an antenna 810.

The terminal 800 also includes a receiver 890 that is also operatively associated with the controller 870. The receiver 890 includes a variable decoder 892 that decodes a signal r(t) received via the antenna 810 according to one of a set of possible codes, for example, one of a set of possible modulation and/or channel codes. According to various embodiments of the present invention, the code employed by the variable decode 892 is selected based on respective likelihood metrics associated with respective decodings of the received signal r(t) with respective codes of the set of possible codes, with the code selection process being biased based on prior communication between the terminal 800 and a station (e.g., base station) transmitting the signal r(t).

For example, the code selection may be biased based on a channel quality measurement, a communications transaction state, an ARQ status message transmitted from the terminal 800 to the transmitting station, or other information relating to prior communication between the terminal 800 and the transmitting station. According to one embodiment of the present invention, a code selection based on the respective likelihood metrics is biased based on prior communication between the terminal and the station from which the signal r(t) is transmitted. In another embodiment of the present invention, the respective likelihood metrics are generated by decoding the received signal r(t) to an extent that is determined based on prior communication between the terminal 800 and the station from which the signal r(t) is transmitted, and the code used by the decoder 892 is selected based on the likelihood metrics so generated. Detailed discussion of these and other exemplary embodiments is provided herein.

It will be appreciated that the receiver 890 and other components of the terminal 800 may be implemented using a variety of hardware and software. For example, portions of the receiver 890, including the variable decoder 892, may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the receiver 890 may be integrated in a single device, such as a single ASIC, they may also be distributed among several devices. Functions of the receiver 890 and the controller 870 may also be combined in one or more devices, such as an ASIC, DSP, microprocessor or microcontroller.

Figure 9:
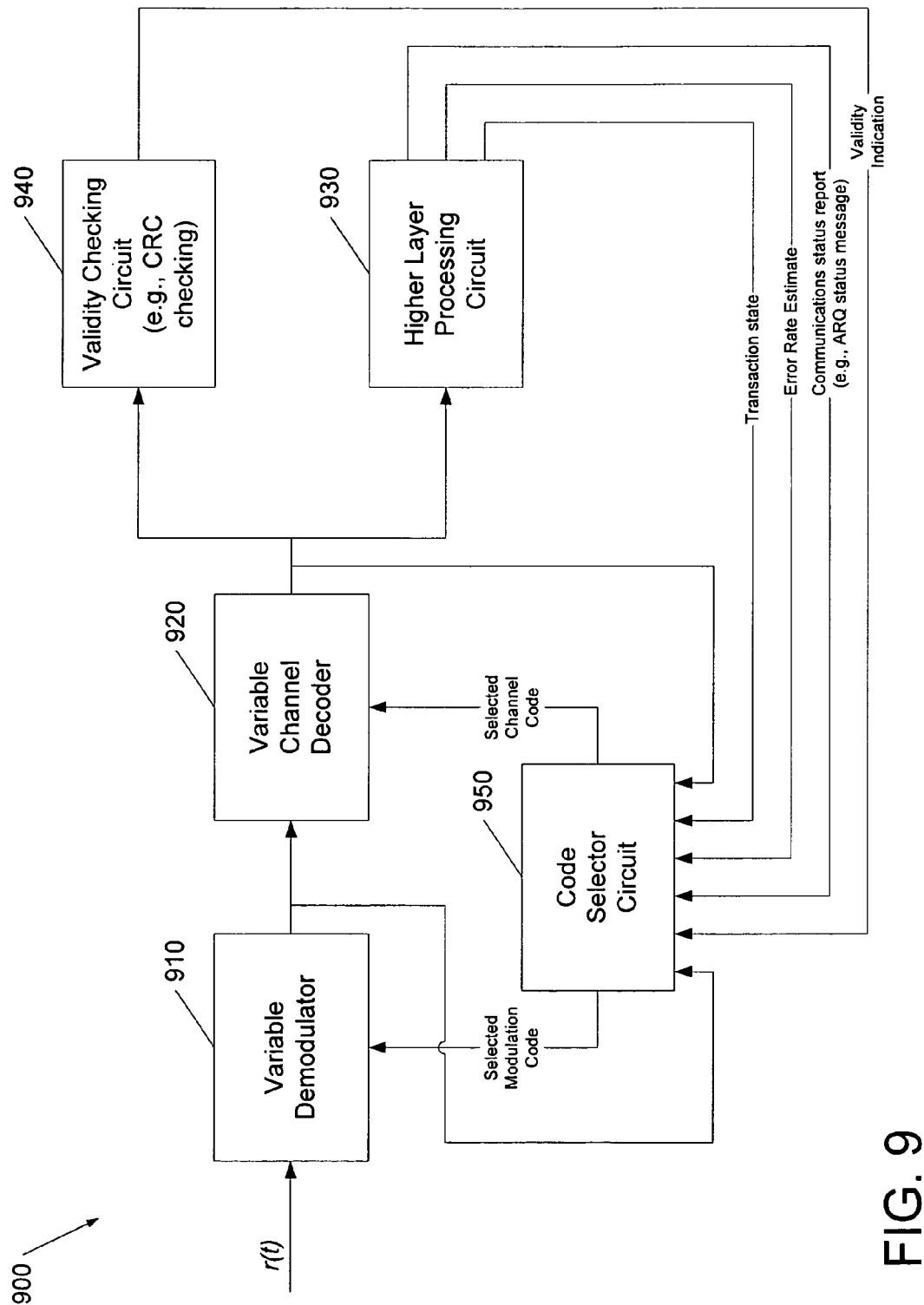
FIG. 9 is a schematic diagram illustrating a receiver according to an embodiment of the present invention.

FIG. 9 illustrates a receiver 900 (as might be utilized in the terminal 800 of FIG. 8) according to one embodiment of the present invention. The receiver 900 includes a variable demodulator 910 that demodulates a received signal r(t) according to a modulation code selected by a code selector circuit 950. The demodulated signal produced by the variable demodulator 910 is then decoded by a variable channel decoder 920 according to a channel code selected by the code selector circuit 950.

Preferably, the code selector circuit 950 selects the modulation and channel codes based on respective likelihood metrics generated by partial decoding of the received signal r(t) according to respective ones of the set of codes which may have been applied to the signal r(t) at the transmitting station, with the selection being biased by information relating to prior communications activity of the receiver 900. It will be appreciated that, in general, the code applied to a signal in a variable coded channel can change on a block-by-block basis, that is, the system limits changes in coding to occur for predetermined quanta of data, such as a predetermined number of frames. Accordingly, the code selection process preferably occurs at the same frequency. Partial decoding according to the respective possible codes as described herein thus comprises a partial decoding of a signal representing such a data block.

The likelihood metrics generated in the partial decoding processes may take a variety of forms. In general, these likelihood metrics may include both "hard" and "soft" information generated by decoding processes that are known to those skilled in the art. For example, if selecting from a set of possible error correcting convolutional codes, the code selector circuit 950 may perform respective maximum likelihood sequence estimation (MSLE) decoding processes for respective ones of the possible channel codes, along the lines of the MLSE decoding processes described in the aforementioned U.S. Pat. No. 5,230,003 to Dent et al. During decoding, these MLSE decoding processes generate metrics that can be used to evaluate which of the channel codes is most likely the channel code used in transmitting the received signal r(t).

Similar techniques can be used for generating demodulation metrics. For example, in a system that applies one of QPSK or 8 PSK modulation to a given block of information, possible respective metrics $M_q$, $M_8$ for respective ones of the types of modulation might be given by:

$$M_q = \sum_{i=1}^{L} |r_i - c_i S_{ij}| \ j = 1, \ldots, 4 \text{ and } M_8 = \sum_{i=1}^{L} |r_i - c_i S_{ij}| \ j = 1, \ldots, 8,$$

where $r_i$ denotes an ith symbol sample for a received signal, L denotes the decoding extent, $c_i$ is a channel estimate for the ith sample, and $S_{ij}$ is a hypothesized transmitted symbol. and K. Techniques for channel estimation for QPSK modulation are described in Jamal et al., "Adaptive MLSE Performance on D-AMPS 1900 Channel," *IEEE Trans. Veh. Technol.*, vol. 46, August, 1997, pp. 634–641, while channel estimates for 8-PSK are described in and Mostafa et al., "Comparing Modulation Options for the Evolution of TDMA Technology," *Proc. of* 1999 *IEEE Veh. Technol. Conf.* (Houston Tex., 1999), and in Arslan et al, "Interpolation and Channel Tracking Based Receivers for Coherent Mary-PSK Modulations," *Proc. of* 1999 *IEEE Veh. Technol. Conf.* (Houston Tex., 1999).

The selections made by the code selector circuit 950 are biased according to prior communications between the terminal 800 and the station transmitting the signal r(t). For example, the decision criterion used to evaluate likelihood metrics produced by the plurality of partial decoding processes and/or the extent to which the received signal r(t) is partially decoded according to the respective possible codes can be biased based on knowledge gained from prior communications. The prior communications information used to bias the code selection process can take several forms. For example, in choosing among codes of a set of codes, the code selector circuit 950 may simply bias the choice towards the code that was last used to recover information transmitted on the same channel as the signal r(t). This biasing may be achieved, for example, by weighting the likelihood metrics produced by the partial decoding processes to favor selection of this "last-used" code.

In other embodiments of the present invention, more detailed information on prior communications may be used, such as measures of channel quality generated from prior communications. For example, information estimates previously produced by the variable demodulator 910 and variable channel decoder 920 may be subjected to a validity check by a validity checking circuit 940, such as a circuit operative to perform a CRC check on demodulated and decoded data, as is commonly done for Layer 2/MAC frames recovered in wireless communications systems. The code selecting circuit 950 may use this validity information to bias a code selection towards or away from a particular selection. Channel quality information may also be gained directly from the outputs of the variable demodulator 910 and/or the variable channel decoder 920, as the estimates (e.g., soft information) produced by these components can reflect channel quality.

The code selector circuit 950 may also utilize information derived from other higher layer processing. For example, a higher layer processing circuit 930 may generate information that indicates the current state of a communications transaction, such as a block data transfer between the receiver 900 and the station that transmits the signal r(t). As will be appreciated by those skilled in the art, a transmitting station that applies variable coding may be expected to apply different types of coding depending on the status of a transaction. For example, for certain types of block or multi-frame data transfers, a transmitting station may apply a robust (but lower throughput) coding for initial blocks or frame that include critical overhead information, but may apply a less robust (but higher throughput) coding to blocks or frame transmitted in later stages of the transfer that include less critical information, such as voice information. Accordingly, the code selector circuit 950 may predict the type of modulation and channel coding that will be applied by the transmitting station based on the transaction state information produced by the higher layer processing circuit 930, and use this prediction to bias a selection of modulation and channel codes to be used by the variable demodulator 910 and the variable channel coder 920.

The higher layer processing circuit 930 may also generate information that indicates channel quality. For example, the higher layer processing circuit 930 may generate an error rate estimate that indicates the quality of the channel over which the signal r(t) is being transmitted. The code selector circuit 950 may use this channel quality information to bias the selection of modulation and channel codes towards codes that would more likely be applied by the station transmitting the signal r(t), which may be expected to tailor its modulation and channel coding to the current channel quality. The code selector circuit 950 may also use this type of information to adjust the extent to which it partially decodes a received signal, as explained in greater detail below.

Similarly, the code selector circuit 950 may bias code selection based on predicted behavior of the transmitting station in response to communications status report that the terminal 800 transmits to the transmitting station. For example, in an ARQ context, the higher layer processing circuit 930 may monitor the number of a series of frames that are successfully recovered by the receiver 900, and transmit a corresponding message (e.g., an ARQ status message) back to the transmitting station. The transmitting station may be expected to control the type of modulation and/or channel coding applied to signals that it transmits based on this transmitted status information, as this status information provides the transmitting station with an indication of channel quality. Accordingly, the code selector circuit 950 may bias the code selection process towards codes that are more likely to be employed by the transmitting station in response to receipt of a particular status report.

Figure 10:
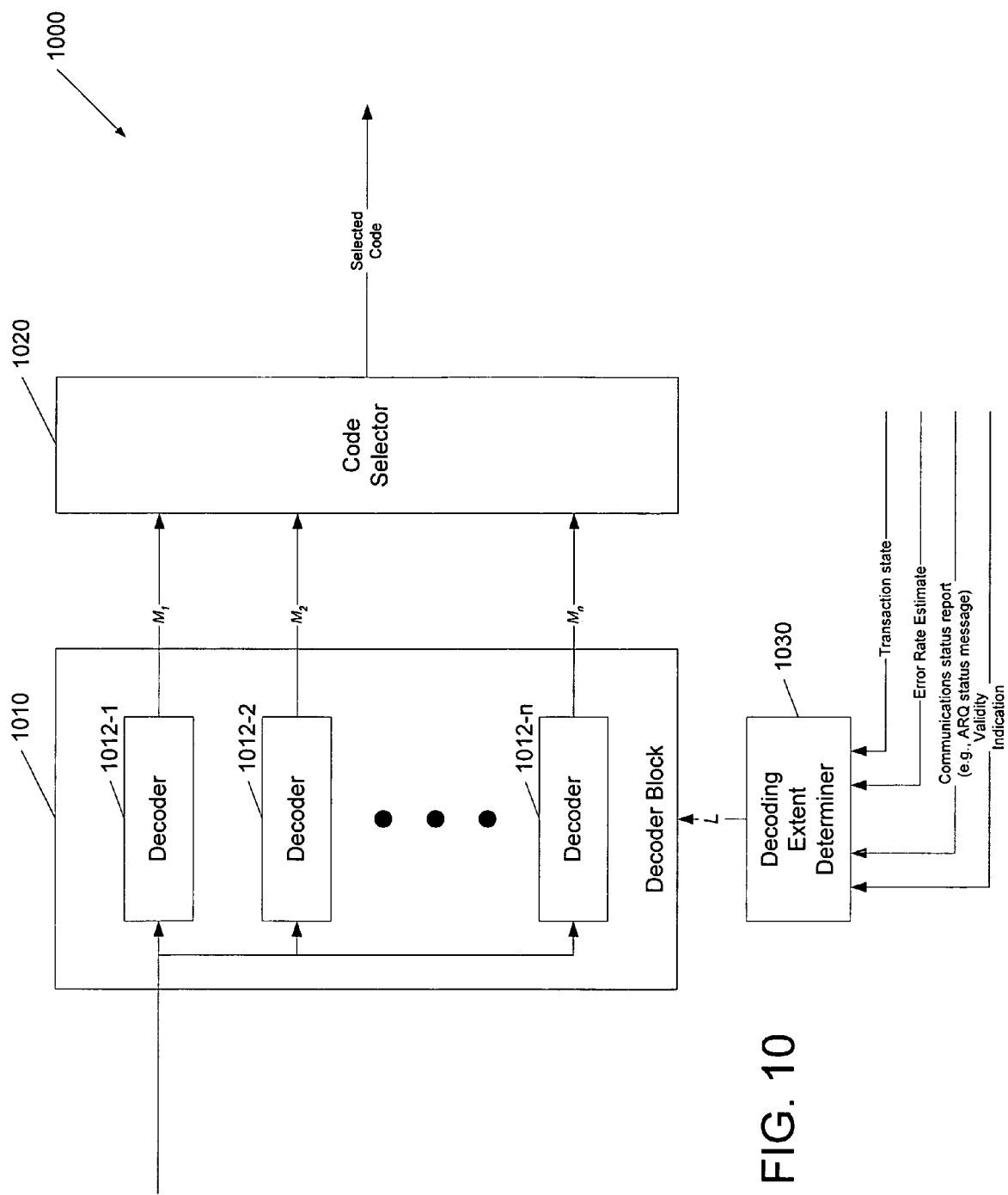
FIG. 10 is a schematic diagram illustrating a code selecting circuit according to an embodiment of the present invention.

FIG. 10 illustrates an exemplary code selector circuit 1000 (which might be utilized in the receiver 900 of FIG. 9) according to an embodiment of the present invention, in which the extent of partial decoding is adjusted based on prior communication between a receiving station (e.g., the wireless terminal 800 of FIG. 8) and a transmitting station (e.g., a cellular base station). The code selector circuit 1000 includes a decoder block 1010 that includes a plurality of decoders 1012-1, 1012-2, ..., 1012-n, a respective one of which decodes a signal r(t) according to a respective code of a set of possible codes that may be applied the signal r(t) and produces a respective likelihood metric $M_1, M_2, \ldots, M_n$ therefrom. Each of the decoders 1012-1, 1012-2, ..., 1012-n decodes the signal r(t) to an extent L that is determined by a decoding extent determiner 1030 based on a prior communications between the terminal 800 and the station transmitting the signal r(t). A code selector 1020 selects a code from the set of possible codes based on the likelihood metrics $M_1, M_2, \ldots, M_n$. Similar to the biasing described with reference to FIG. 9, the decoding extent determiner can determine the decoding extent L based on such information as a state of a communications transaction between the terminal 800 and the station transmitting the signal r(t), an error rate estimate for a channel between the terminal 800 and the station transmitting the signal r(t), a communications status report transmitted from the terminal 800 to the station transmitting the signal r(t) (or vice versa), and a validity indication (e.g., CRC check result) from information previously received from the station transmitting the signal r(t).

It will be appreciated that configurations other than that illustrated in FIG. 10 may be used with the present invention. For example, instead of using parallel decoders such as the decoders 1012-1, 1012-2, ..., 1012-n to perform partial decoding according to the respective codes in a parallel fashion, decoding can be performed in a serial fashion using a general purpose decoder that may be configured to perform decoding according to each of the candidate codes.

The extent L can be determined in a number of different ways. For example, system modeling can be used to establish a mathematical relationship between desired extent L and parameters such as estimated bit error rate, estimated frame error rate, or the like. This mathematical relationship can then be used, for example, to compute an appropriate extent L for a given bit error rate, frame error rate or the like, during normal operation of the receiving station. Such a mathematical relationship may also be adaptively developed or adjusted during operation of the receiving station.

Figure 7:
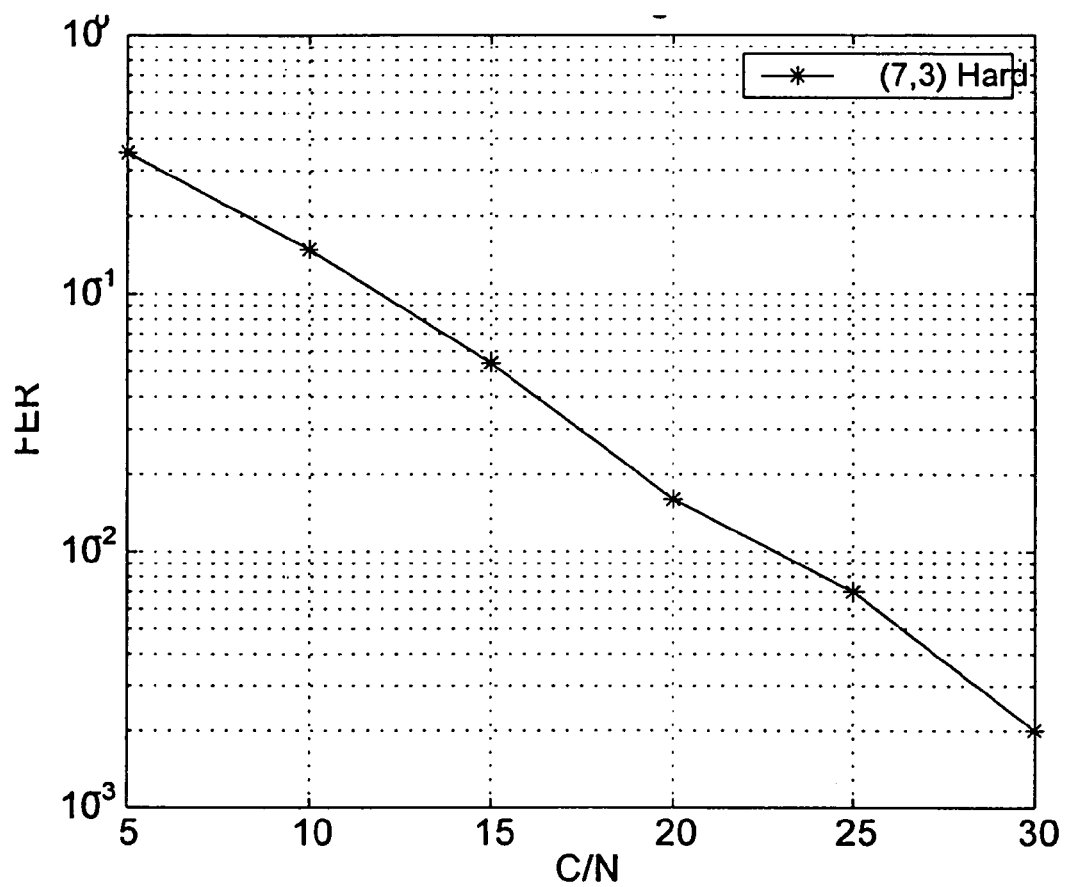
FIG. 7 illustrates simulation results for frame error rate in a MANGO system using a data frame type (DFT) indicator.

FIGS. 11–17 are flowchart illustrations illustrating exemplary operations for decoding variably encoded signals according to aspects of the present invention. It will be understood that blocks of the flowchart illustrations of FIGS. 11–1 7, and combinations of blocks in the flowchart illustrations, may be implemented using electronic circuits included in a receiving station, such as the wireless terminal 800 illustrated in FIG. 8. It will also be appreciated that blocks of the flowchart illustrations of FIGS. 11–17, and combinations of blocks in the flowchart illustrations, may be implemented using components other than those illustrated in FIG. 8, and that, in general, the blocks of the flowchart illustrations of FIGS. 11–17, and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 11–17 support electronic circuits and other means for performing the specified functions, as well as combinations of steps for performing the specified functions. It will be understood that the circuits and other means supported by each block of the flowchart illustrations of FIGS. 11–17, and combinations of blocks therein, can be implemented by special purpose hardware, software or firmware operating on special or general purpose data processors, or combinations thereof.

Figure 11:
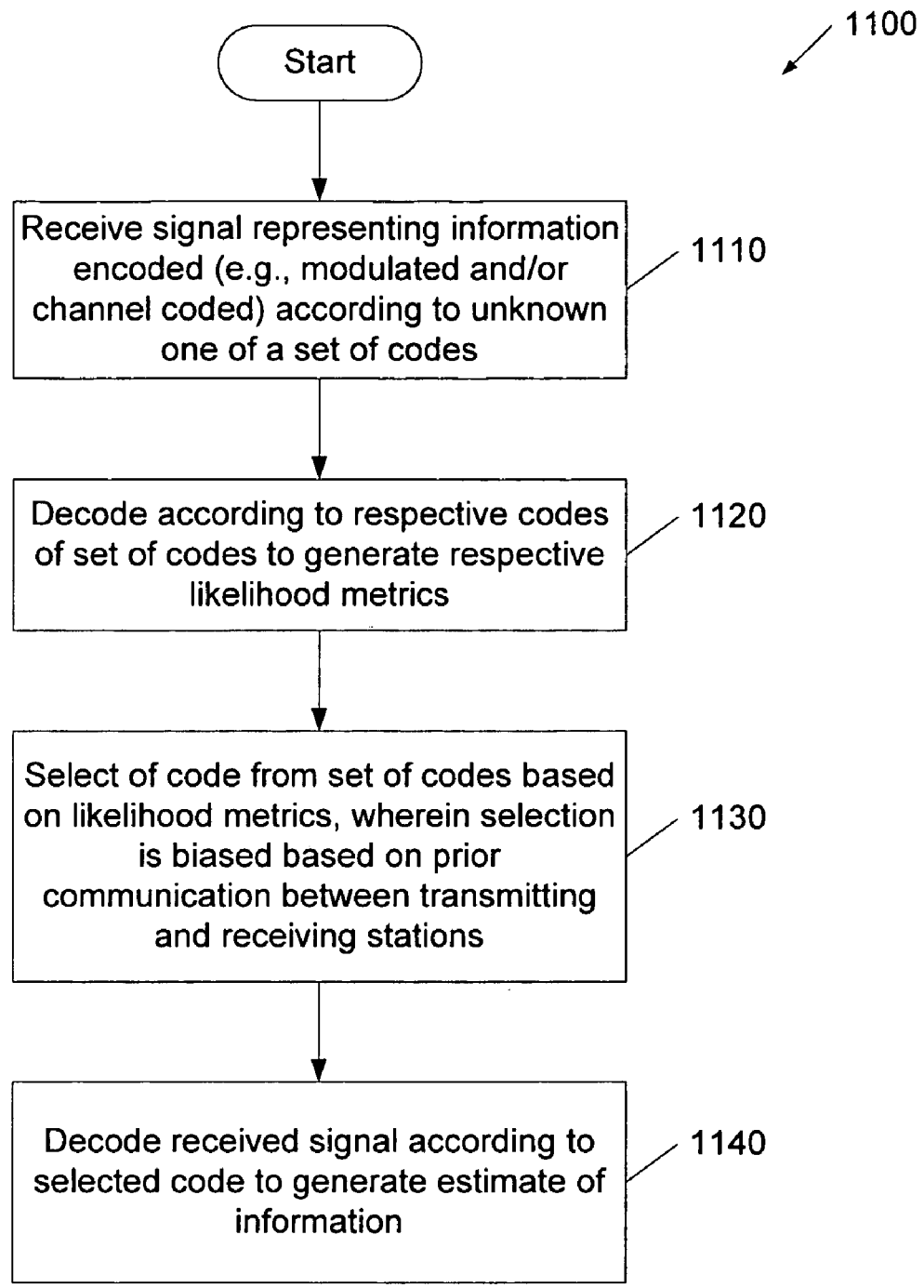
FIGS. 11–17 are flowcharts illustrating exemplary operations for decoding variably decoded signals according to various embodiments of the present invention.

FIG. 11 illustrates exemplary operations 1100 for decoding a signal that is coded according to an unknown one of a set of possible codes (e.g., modulation and/or channel codes) according to one embodiment of the present invention. A signal representing information encoded according to an unknown code of a set of possible codes is received at a receiving station (Block 1110). The received signal, e.g., a signal corresponding to a transmitted slot in a TDMA communications system, is partially decoded according to respective codes of the set of codes to generate respective likelihood metrics associated with respective ones of the codes (Block 1120). A code is selected from the set of codes based on the generated likelihood metrics, with the decision being biased based on a prior communication between the receiving station and the station that transmitted the signal (Block 1130). The received signal is then fully decoded according to the selected code to generate an estimate of information represented by the signal (Block 1140).

Figure 12:
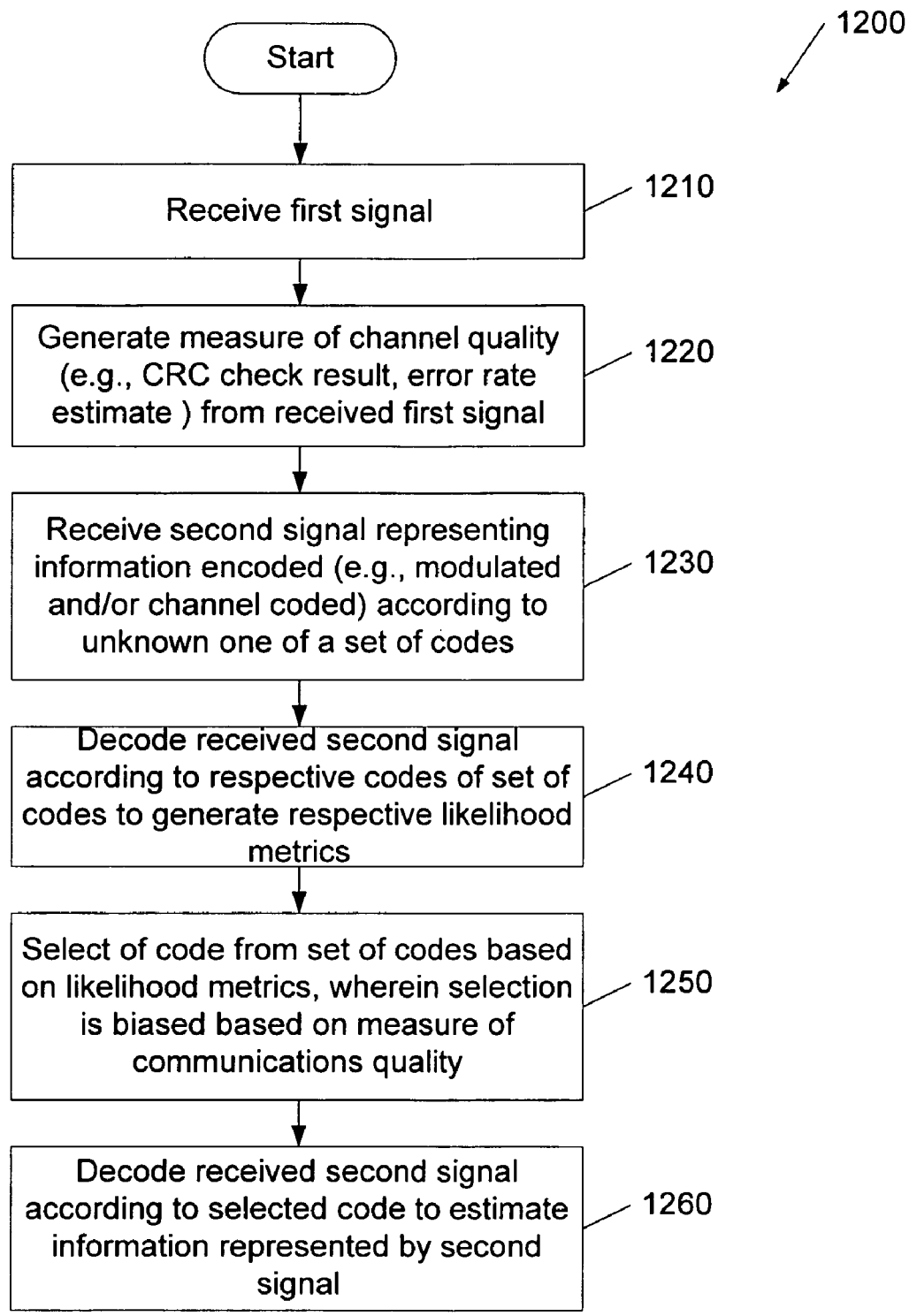

FIG. 12 illustrates exemplary operations 1200 according to another embodiment of the present invention, in which a code selection is biased according to a measure of channel quality. A first signal is received at a receiving station (1210). A measure of channel quality is generated from the received first signal, e.g., by decoding the received first signal and performing a CRC or similar error check on the decoded signal (Block 1220). A second signal representing information encoded according to an unknown one of a set of possible code is then received at the receiving station (Block 1230). The received second signal is partially decoded according to respective codes of the set of possible codes to generate respective likelihood metrics (Block 1240). A code from the set of codes is then selected based on the likelihood metrics, with the selection being biased based on the previously determined measure of channel quality (Block 1250). The received second signal is then fully decoded according to the selected code to estimate the information represented by the second signal. (Block 1260).

Figure 13:
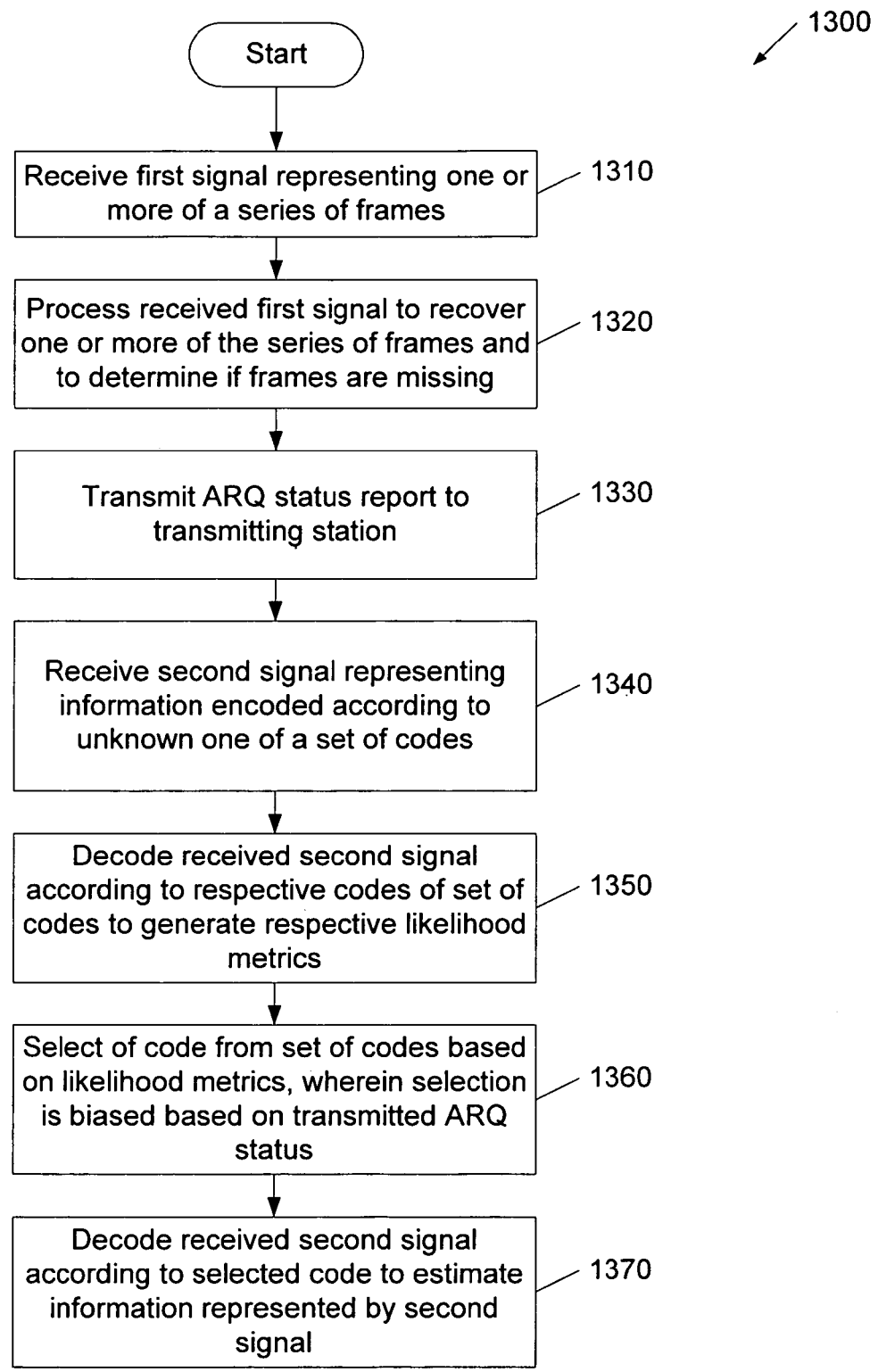

In operations 1300 according to another embodiment of the present invention illustrated in FIG. 13, a code selection is biased according to a status report transmitted by the terminal, for example, an ARQ status message that indicates the degree of success in communicating a series of frames. A first signal is received at a receiving station (Block 1310). The received first signal is processed to recover one or more of a series of frames and to determine whether frames have not been recovered (Block 1320). The receiving station then transmits an ARQ status message identifying the unrecovered frames (Block 1330). As explained above, the transmitting station may elect to alter the coding it applies to transmitted signals based on this status report. Accordingly, after a second signal from the transmitting station having an unknown coding is received (Block 1340) and partially decoded according to respective ones of the set of possible codes to generate likelihood metrics (Block 1350), the receiving station can bias a selection of one of the codes based on the previously transmitted status report, as this can give an indication of that type of coding the transmitting station is likely to apply (Block 1360). The received second signal is then fully decoded according to the selected code to recover the information represented by the second signal (Block 1370).

Figure 14:
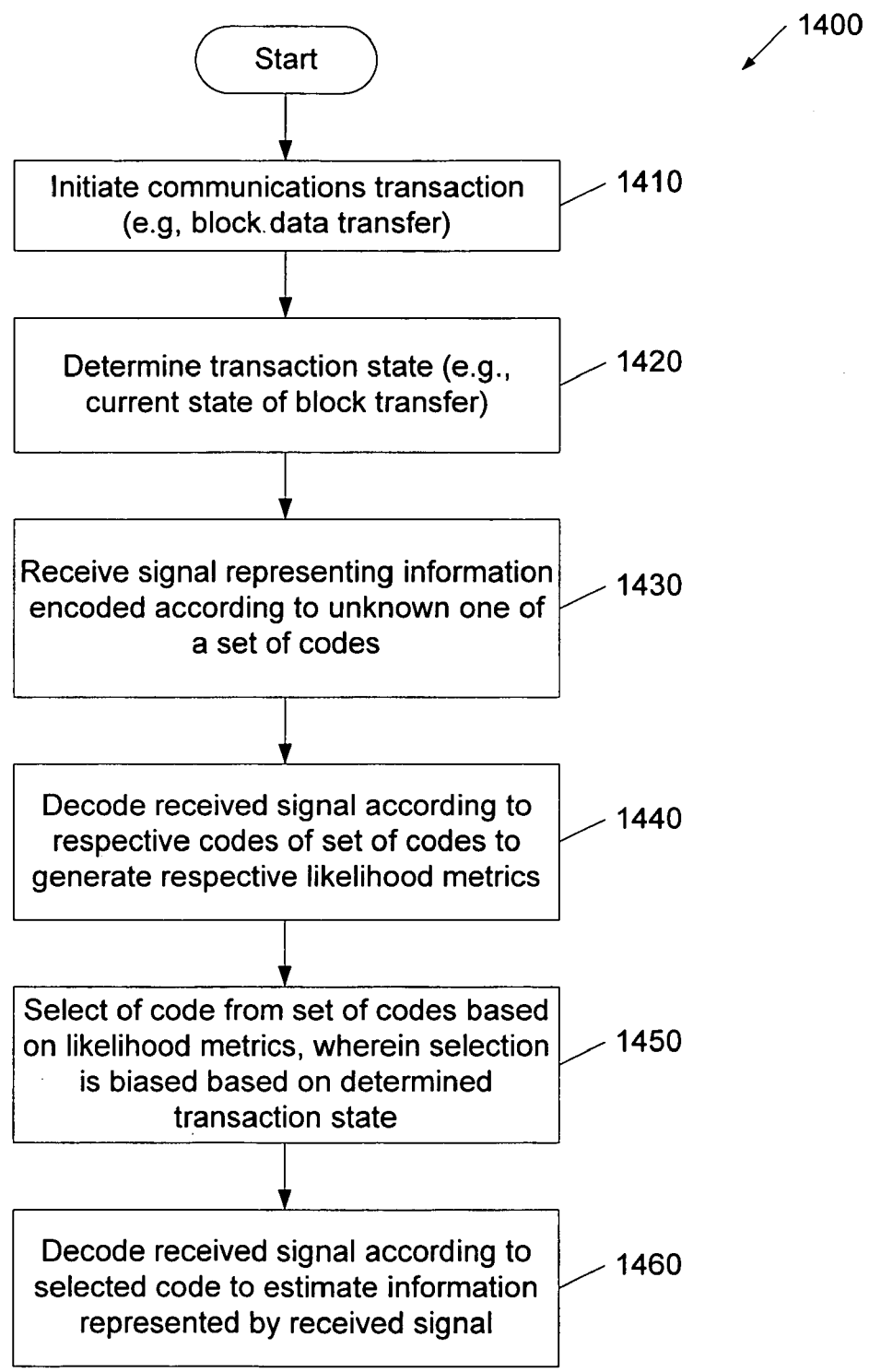

FIG. 14 illustrates exemplary operations 1400 according to yet another embodiment of the present invention, in which a code selection is biased based on a state of a communications transaction. A communications transaction between a transmitting and receiving station, e.g., a block data transfer, is initiated (Block 1410). During the transaction, the receiving station determines a state of the transaction, such as the degree to which the block data transfer has progressed (Block 1420). The receiving station then receives a signal representing information encoded according to an unknown one of a set of possible codes (Block 1430). The receiving station partially decodes the received signal according to respective ones of the set of codes, generating respective likelihood metrics (Block 1440). The receiving station then selects a code from the set of codes based on the likelihood metrics, with the selection being biased based on the determined transaction state (Block 1450). The receiving station then fully decodes the received signal according to the selected code to estimate the information represented by the signal (Block 1460).

Figure 15:
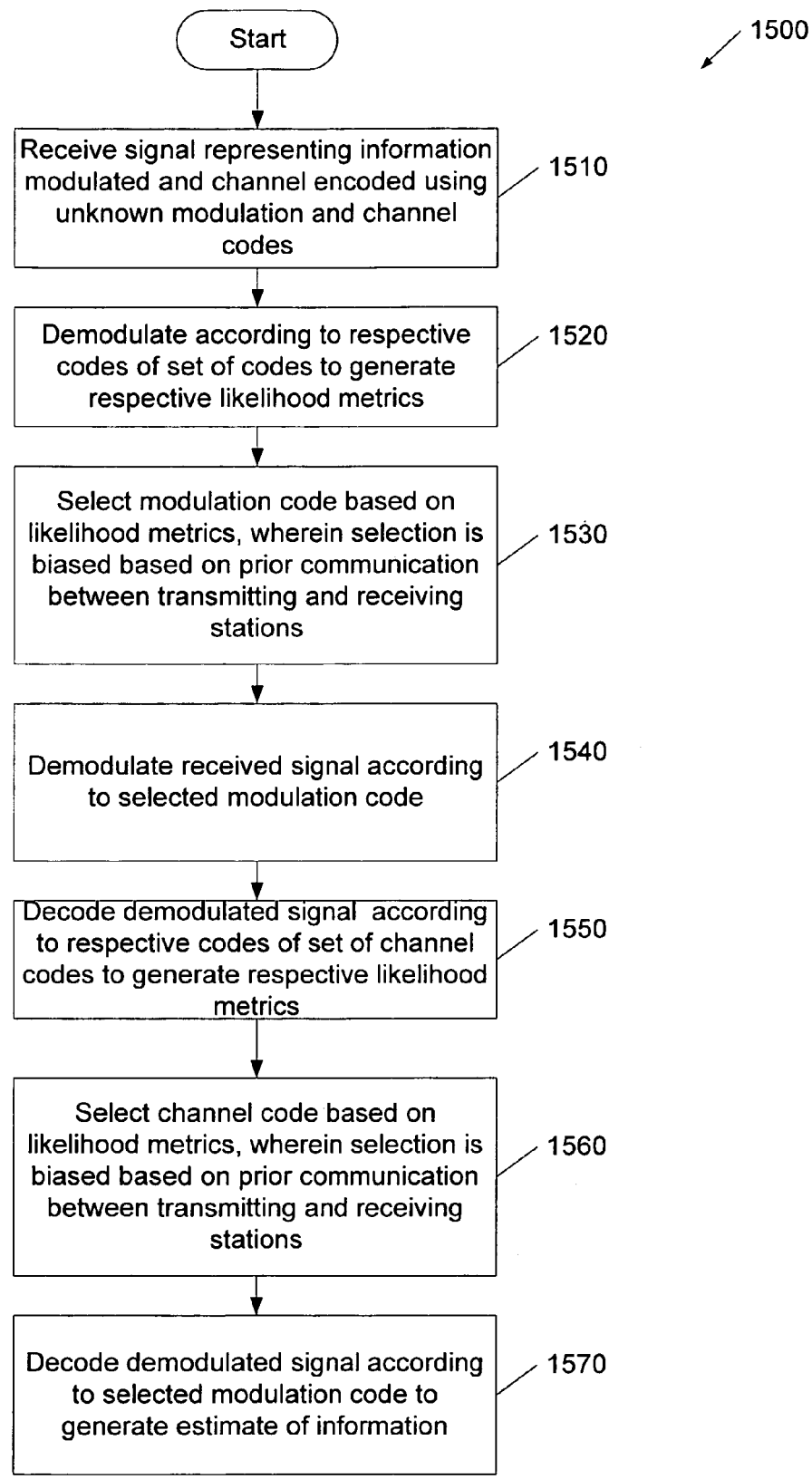

FIG. 15 illustrates exemplary operations 1500 according to yet another aspect of the present invention, in which a signal having unknown modulation and channel coding is subjected to a two-stage coding identification process. A signal representing information encoded according to unknown modulation and channel codes from respective sets of possible modulation codes and channel codes is received at a receiving station (Block 1510). The received signal is partially demodulated according to respective modulation codes of the set of modulation codes to generate respective likelihood metrics (Block 1520). These likelihood metrics may include, for example, metrics such as those described in the aforementioned U.S. patent application Ser. No. 09/143,754 or other measures, such as numbers of synchronization bits or similar predetermined or known information successfully recovered in the respective demodulation processes. For example, a particular advantageous demodulation metric for information transmitted according to the MANGO formats of FIGS. 4 and 6 might be one derived from demodulation of the pilot symbol fields P, which generally will be incorrectly recovered if the wrong demodulation is used.

After generation of the respective likelihood metrics, a modulation code is then selected from the set of modulation codes based on the likelihood metrics, with the selection being biased based on prior communication between the receiving station and the station that transmitted the signal, e.g., based on a measure of channel quality, a transaction state, an ARQ status message, or the like (Block 1530). This may comprise, as described above, a straightforward weighted comparison of the respective metrics, or more complex biasing techniques. For example, in the QPSK/8-PSK MANGO system described herein, metrics $M_q$, $M_8$ for QPSK and 8PSK modulation may be marginally different at a certain decoding extent L, due to the fact that the QPSK modulation constellation is a subset of the 8-PSK modulation constellation. Consequently, in comparing metrics for the given coding extent L, it may be desirable to first examine a ratio $M_8/M_q$ to see if it meets a predetermined criterion that gives confidence that the correct demodulation can be selected based on the current metrics. If not, the received signal can be further decoded (i.e., L increased), to provide better discrimination. Once a modulation code is selected, the received signal is then fully demodulated according to the selected modulation code (Block 1540).

The demodulated signal is then partially decoded according to respective channel codes of the set of possible channel codes to generate respective likelihood metrics (Block 1550). A channel code is then selected based on these likelihood metrics, with the selection being biased based on prior communication between the transmitting and receiving stations (Block 1560). The demodulated signal is then fully decoded according to the selected channel code to generate an estimate of the information represented by the received signal (Block 1570).

Figure 16:
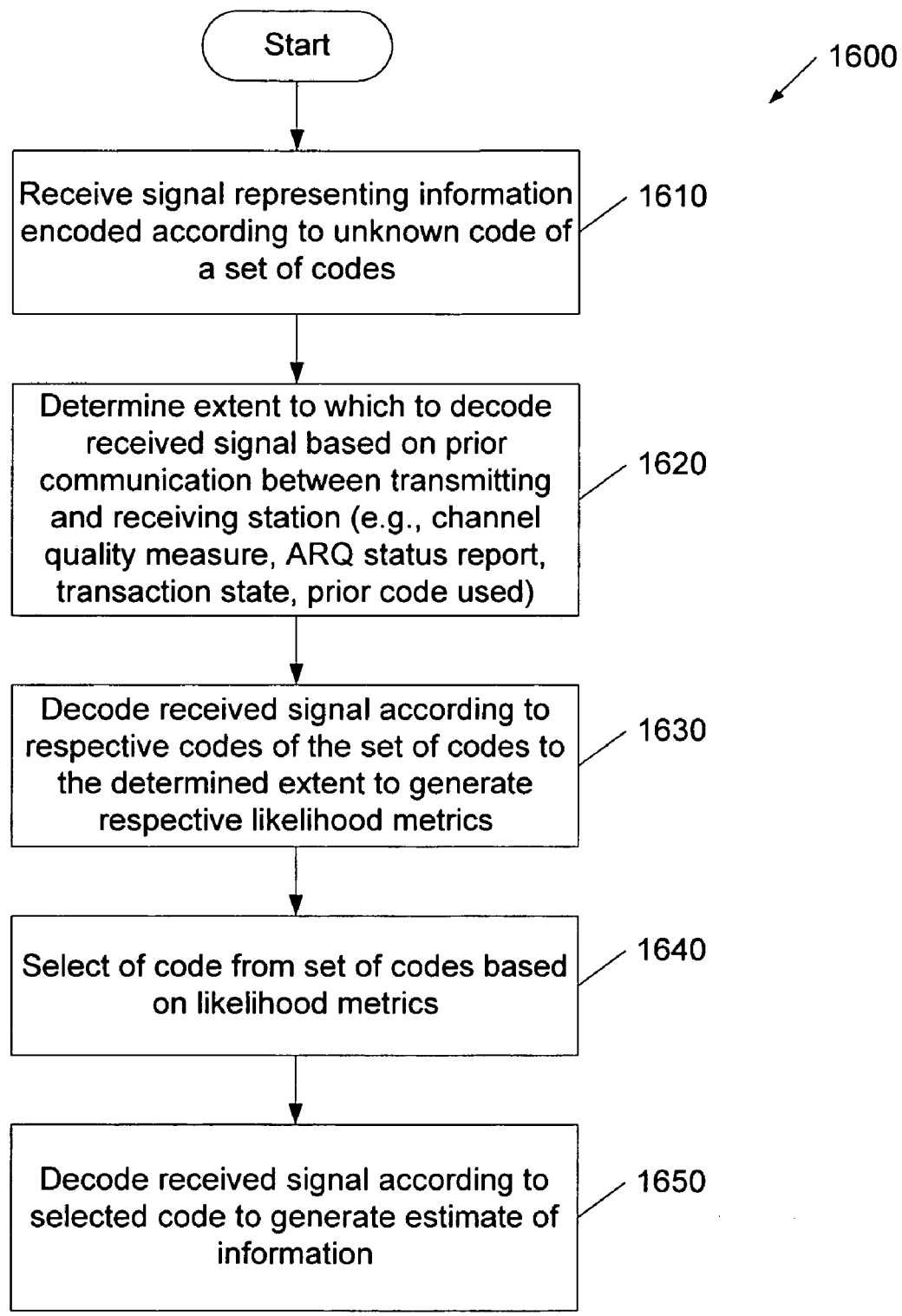

According to another aspect of the present invention, the extent to which a received signal having unknown coding is partially decoded to generate likelihood metrics is also determined based on information gained from prior communications between receiving and transmitting stations. FIG. 16 illustrates exemplary operations 1600 according to this aspect of the present invention. A signal encoded according to an unknown code of a set of possible codes is received at a receiving station (Block 1610). An extent to which to partially decode the received signal is determined based on prior communications between the receiving station and the station that transmitted the received signal, e.g., based on a channel quality estimate, an ARQ status, a transaction state, or the like (Block 1620). The received signal is partially decoded according to respective ones of the possible codes to the determined extent to generated respective likelihood metrics (Block 1630). A code is then selected from the set of partially selected codes based on the generated likelihood metrics (Block 1640), and is used to fully decode the received signal and generate an estimate of information represented by the signal (Block 1650).

Figure 17:
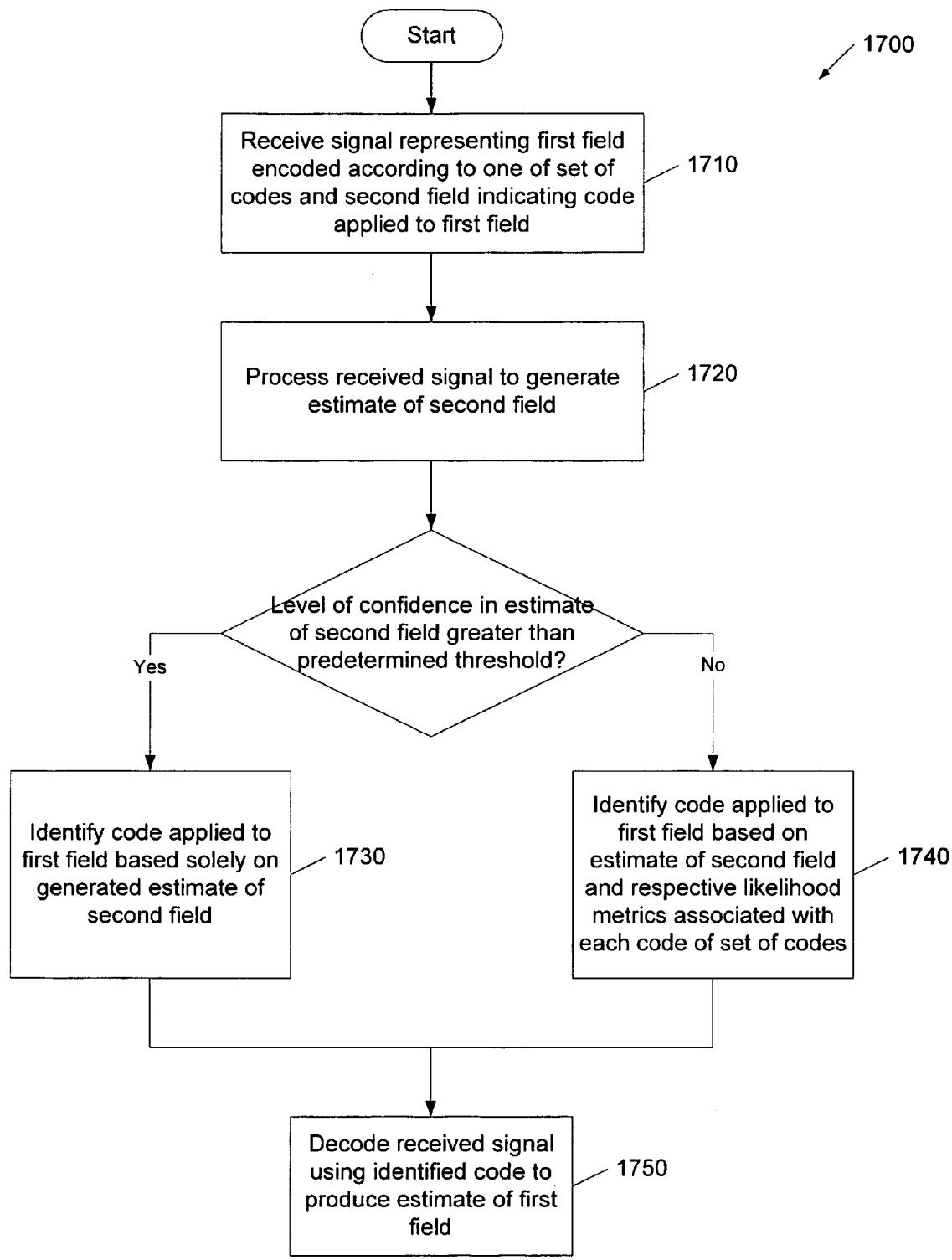

FIGS. 11–16 illustrate biased code selection techniques which are applicable to variably coded signals, whether or not a coding indicator (in-channel or out-of-channel) is provided. FIG. 17 illustrates exemplary selective decoding operations 1700 for a signal that represents a first variably coded code field and a second (code indicator) field that indicates the coding applied to the first field. A signal representing the first and second fields is received at a receiving station (Block 1710). The received signal is then processed to generate an estimate of the second field (Block 1720). For example, in the MANGO system referenced above, the second field may include an encoded CDFT/CSFP field of a slot, which is decoded according to an appropriate code to generate an estimate of the coding applied to the data field(s) of the slot. Depending on the level of confidence that the receiving station has in the generated estimate of the second field, it may choose either select a code for decoding the first field based solely on the generated estimate of the coding indicator field (Block 1730), or it may select a code based on a combination of the information in the estimate of the second field with likelihood metrics generated by partially decoding the received signal according to respective ones of the set of possible codes which may have been applied to the first field (Block 1740). The level of confidence in the estimate of the second field may be determined in a number of ways, including by using a decoding metric associated with decoding the second field, as well as by using other measures, such as measures of channel quality such as error rate estimates for the channel over which the second field is communicated. The receiving station fully decodes the received signal according to the selected code to generate an estimate of the first field (Block 1750).

It will be appreciated that the operations 1700 of FIG. 17 can be modified to include code selection biasing such as that described with reference to FIGS. 12–16. For example, The decision as to whether to rely on the decoded coding indicator field can be biased based on knowledge gained from prior communication, such as a channel quality estimate, an ARQ status, an error rate estimate, or the like. Similarly, if the receiving station decides to select a code based on both the estimate of the coding indicator field and likelihood metrics generated from partial decoding of the variably coded payload, this selection may also be biased according to knowledge gained from prior communications. Finally, the extent to which the receiving station partially decodes the signal to generate likelihood metrics can be determined based on such prior communications information.

The selection of codes described above with reference to FIGS. 11–17 preferably occurs at the same frequency or at a greater frequency than the frequency at which the coding applied to signals transmitted by the transmitting station may change. It will be appreciated, however, that other techniques fall within the scope of the present invention. For example, code selection may occur over a plurality of slots or some other quantum of information. In addition, some of the adaptive processes described above, such as determining an extent to which to partially decode a received signal according to the respective possible codes, can be determined over larger time intervals. Thus, for example, while selection decisions preferably on a occur on a block-by-block basis, as described above, the extent to which a received signal is partially decoded according to a set of possible codes to generate likelihood metrics for these block-by-block selections can be determined at a lower frequency based on data for several blocks. In this manner, transient phenomena can be filtered out and computational efficiency can be increased.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of processing a signal representing information coded according to a code selected from a set of codes, the method comprising the steps of:
   receiving the signal at a first station;
   decoding the received signal according to respective codes of the set of codes to generate respective likelihood metrics associated with respective codes of the set of codes;
   selecting a code from the set of codes based on the respective likelihood metrics, wherein the selection of the code from the set of codes is biased based on a communication between the first station and a second station that transmitted the signal that occurred prior to reception of the signal at the first station; and decoding the received signal according to the selected code to generate an estimate of the information.

2. A method according to claim 1:
wherein said step of selecting a code from the set of codes is preceded by the step of generating a measure of quality for a channel over which the signal is communicated based on a communication between the first and second stations; and
wherein said step of selecting a code from the set of codes comprises the step of biasing the selection of a code from the set of codes based on the generated measure of channel quality.

3. A method according to claim 2, wherein said step of generating a measure of channel quality comprises the step of determining at least one of an error indication, a CRC check result, an error rate estimate, and a signal to noise ratio.

4. A method according to claim 1:
wherein said step of selecting a code from the set of codes is preceded by the step of communicating a communications status report between the first and second stations; and
wherein said step of selecting a code from the set of codes comprises the step of biasing a selection of a code from the set of codes based on the communications status report.

5. A method according to claim 4, wherein said step of communicating a communications status report comprises the step of communicating an ARQ (automatic repeat request) status message between the first and second stations.

6. A method according to claim 1, wherein said step of selecting a code from the set of codes comprises the steps of:
determining a state of a communications transaction between the first and second stations; and
biasing a selection of a code from the set of codes based on the determined state of the communications transaction.

7. A method according to claim 2:
wherein said step of decoding the received signal according to respective codes of the set of codes to generate respective likelihood metrics associated with respective codes of the set of codes is preceded by the steps of;
receiving a first signal; and
decoding the received first signal according to a first code of the set of codes to generate an estimate of information represented by the previously transmitted signal;
wherein said step of receiving a signal comprises the step of receiving a second signal;
wherein said step of decoding the received signal according to respective codes of the set of codes to generate respective likelihood metrics associated with respective codes of the set of codes comprise the step of decoding the received second signal according to respective codes of the set of codes to generate respective likelihood metrics associated with respective codes of the set of codes; and
wherein said step of selecting a code from the set of codes comprises the step of biasing a selection of a code from the set of codes based on the first code used to decode the received first signal.

8. A method according to claim 7:
wherein said step of decoding the received first signal according to one of the codes of the set of codes is followed by the step of determining validity of the generated estimate of the information represented by the first signal; and
wherein said step of biasing a selection of a code from the set of codes based on the first code used to decode the previously transmitted signal comprises the step of biasing the selection of the code from the set of codes based on the determined validity of the generated estimate of the information represented by the first signal.

9. A method according to claim 8, wherein said step of determining validity of the generated estimate of the information represented by the first signal comprises the step of performing a CRC check on the generated estimate of the information represented by the first signal.

10. A method according to claim 1, wherein the signal represents a first field and a second field, wherein the first field is coded according to a code selected from a set of codes and the second field indicates the code applied to the first field, and:
wherein said step of selecting a code from the set of codes based on the respective likelihood metrics comprises the steps of:
processing the received signal to generate an estimate of the second field; and
selecting a code from the set of codes based on the respective likelihood metrics and the generated estimate of the second field; and
wherein said step of decoding the received signal according to the selected code comprises the step of decoding the received signal according to the selected code to generate an estimate of the first field.

11. A method according to claim 1, wherein a respective code of the set of codes comprises a respective combination of a modulation code and a channel code.

12. A method of processing a signal representing a first field and a second, field, wherein the first field is coded according to a code selected from a set of codes and the second field indicates the code applied to the first field, the method comprising the steps of:
receiving the signal at a first station;
processing the received signal to generate an estimate of the second field;
identifying the code applied to the first field based on a selected one of the generated estimate of the second field or a combination of the generated estimate of the second field and respective likelihood metrics associated with decoding the received signal according to respective codes of the set of codes, wherein selection is based on a confidence in the generated estimate of the second field; and
decoding the received signal according to the identified code to produce an estimate of the first field.

13. A method according to claim 12:
wherein said step of identifying the code applied to the first field comprises the steps of:
decoding the received signal according to respective codes of the set of codes; and
generating respective likelihood metrics for the respective decodings of the received signal according to the respective codes of the set of codes.

14. A method according to claim 13, wherein said step of decoding the received signal according to respective codes of the set of codes comprises the step of decoding the received signal according to respective codes of the set of codes to an extent that is determined based on a confidence in the generated estimate of the second field.

15. A method according to claim 13, wherein said step of decoding the received signal according to respective codes of the set of codes comprises the step of decoding the received signal according to respective codes of the set of codes to an extent that is determined based on prior communication between the first station and a second station that transmitted the signal.

16. A method of processing a signal representing a first field and a second field, wherein the first field is coded according to a code selected from a set of codes and the second field indicates the code applied to the first field, the method comprising the steps of:

receiving the signal at a first station;

processing the received signal to generate an estimate of the second field;

identifying the code applied to the first field based on a selected one of the generated estimate of the second field or a combination of the generated estimate of the second field and respective likelihood metrics associated with decoding the received signal according to respective codes of the set of codes, wherein selection is based on a confidence in the generated estimate of the second field, and wherein said step of identifying the code applied to the first field comprises the steps of:

decoding the received signal according to respective codes of the set of codes, wherein said step of decoding the received signal according to respective codes of the set of codes to an extent that is determined based on prior communication comprises the step of decoding the received signal according to respective codes of the set of codes to an extent that is determined based on at least one of a measure of channel quality, a communications status report transmitted between the first station and a second station that transmitted the signal, an error indication, an error rate estimate, a state of a communications transaction between the first station and the second station, and an extent to which a previously received signal was decoded; and generating respective likelihood metrics for the respective decodings of the received signal according to the respective codes of the set of codes; and decoding the received signal according to the identified code to produce an estimate of the first field.

17. A method according to claim 12, wherein said step of identifying the code applied to the first field comprises the step of biasing a selection of a code from the set of codes based on prior communication between the first station and a second station that transmitted the signal that occurred prior to reception of the signal at the first station.

18. A method of processing a signal representing a first field and a second field, wherein the first field is coded according to a code selected from a set of codes and the second field indicates the code applied to the first field, the method comprising the steps of:

receiving the signal at a first station;

processing the received signal to generate an estimate of the second field;

identifying the code applied to the first field based on a selected one of the generated estimate of the second field or a combination of the generated estimate of the second field and respective likelihood metrics associated with decoding the received signal according to respective codes of the set of codes, wherein selection is based on a confidence in the generated estimate of the second field, wherein said step of identifying the code applied to the first field comprises the step of biasing a selection of a code from the set of codes based on prior communication between the first station and a second station that transmitted the signal that occurred prior to reception of the signal at the first station, and wherein said step of biasing a selection of a code from the set of codes comprises the step of biasing the selection of a code from the set of codes based on at least one of a measure of channel quality, a communications status report transmitted between the first station and a second station that transmitted the signal, an error indication, an error rate estimate, a state of a communications transaction between the first station and the second station, and an extent to which a previously received signal was decoded; and decoding the received signal according to the identified code to produce an estimate of the first field.

19. A method according to claim 12, wherein the first field is coded according to a channel code of a set of channel codes and is modulated according to a modulation code of a set of modulation codes, wherein the second field indicates the channel code and the modulation code applied to the first field, and wherein said step of identifying the code applied to the first field comprises the steps of:

generating respective likelihood metrics associated with demodulating and decoding the received signal according to respective combinations of ones of the set of modulation codes and ones of the set of channel codes; and identifying the channel code and the modulation code applied to the first field based on the generated estimate of the second field and the generated likelihood metrics.

20. A method according to claim 12, wherein the first field is coded according to a channel code of a set of channel codes and is modulated according to a modulation code of a set of modulation codes, wherein the second field indicates the channel code and the modulation code applied to the first field, and wherein said step of identifying the code applied to the first field comprises the steps of:

generating respective likelihood metrics associated with demodulating the received signal according to respective modulation codes of the set of modulation codes;

identifying the modulation code applied to the first field based on the generated estimate of the second field and the generated likelihood metrics associated with demodulating the received signal according to respective modulation codes of the set of modulation codes;

demodulating the received signal according to the determined modulation code;

generating respective likelihood metrics associated with decoding the demodulated signal according to respective channel codes of the set of channel codes; and identifying the channel code applied to the first field based on the generated estimate of the second field and the generated respective likelihood metrics associated with decoding the demodulated signal according to respective channel codes of the set of channel codes.

21. A method of processing a signal representing information coded according to a code selected from a set of codes, the method comprising the steps of:

receiving the signal at a first station;

determining an extent to which to decode the received signal based on a communication between the first station and a second station that transmitted the signal that occurred prior to reception of the signal at the first station;

decoding the received signal according to respective codes of the set of codes to the determined extent to generate respective likelihood metrics associated with respective codes of the set of codes;

selecting a code from the set of codes based on the respective likelihood metrics; and decoding the received signal according to the selected code to generate an estimate of the information.

22. A method according to claim 21, wherein said step of determining an extent comprises the steps of:

generating a measure of quality for a channel over which the signal is communicated; and determining the extent to which to decode the received signal based on the generated measure of channel quality.

23. A method according to claim 22, wherein said step of generating a measure of channel quality comprises the step of generating at least one of an error indication, a CRC check result, an error rate estimate, and a signal to noise ratio estimate.

24. A method according to claim 21, wherein said step of determining an extent to which to decode the received signal comprises the steps of:

communicating a communications status report between the first and second stations; and determining the extent to which to decode the received signal based on the communications status report.

25. A method according to claim 24, wherein said step of communicating a communications status report comprises the step of communicating an ARQ status message between the first and second stations.

26. A method according to claim 21, wherein said step of determining an extent to which to decode the received signal comprises the steps of:

determining a state of a communications transaction between the first and second stations; and determining the extent to which to decode the received signal based on the determined state of the communications transaction.

27. A method of processing a signal representing information coded according to a code selected from a set of codes, the method comprising the steps of:

receiving the signal at a first station;

determining an extent to which to decode the received signal based on a communication between the first station and a second station that transmitted the signal that occurred prior to reception of the signal at the first station;

decoding the received signal according to respective codes of the set of codes to the determined extent to generate respective likelihood metrics associated with respective codes of the set of codes;

selecting a code from the set of codes based on the respective likelihood metrics; and decoding the received signal according to the selected code to generate an estimate of the information, wherein said step of determining an extent to which to decode the received signal is preceded by the steps of:

receiving a first signal; and decoding the received first signal according to respective codes of the set of codes to a first extent to generate respective first likelihood metrics associated with respective codes of the set of codes;

wherein said step of receiving a signal comprises the step of receiving a second signal; and wherein said step of determining an extent to which to decode the received signal comprises the step of determining an second extent to which to decode the received second signal based on the first extent to which the received first signal was decoded.

28. A method according to claim 27:

wherein said step of decoding the received first signal is followed by the steps of:

selecting a first code of the set of codes based on the respective first likelihood metrics;

decoding the received first signal according to the selected first code to generate an estimate of information represented by the first signal; and determining validity of the generated estimate of the information represented by the first signal; and wherein said step of determining a second extent to which to decode the received second signal based on the first extent to which the received first signal was decoded comprises the step of determining the second extent to which to decode the received second signal based on the first extent to which the received first signal was decoded and the determined validity of the generated estimate of the information represented by the first signal.

29. A method according to claim 28, wherein said step of determining validity of the generated estimate of the information represented by the first signal comprises the step of performing a CRC check on the generated estimate of the information represented by the first signal.

30. A method according to claim 21, wherein the signal represents a first field and a second field, wherein the first field is coded according to a code selected from a set of codes and the second field indicates the code applied to the first field, and:

wherein said step of determining an extent to which to decode the received signal comprises the steps of:

processing the received signal to generate an estimate of the second field; and determining the extent to which to decode the received signal based on a confidence in the generated estimate of the second field; and wherein said step of decoding the received signal according to the selected code to generate an estimate of the information comprises the step of decoding the received signal according to the selected code to generate an estimate of the first field.

31. A wireless station, comprising:

a receiver that receives a signal representing information coded according to a code selected from a set of codes, that decodes the received signal according to respective codes of the set of codes to generate respective likelihood metrics associated with respective codes of the set of codes and that selects a code from the set of codes based on the respective likelihood metrics, and that decodes the received signal according to the selected code to generate an estimate of the information, wherein the selection of the code from the set of codes is biased based on a communication between the wireless station and a station that transmitted the signal that occurred prior to reception of the signal.

32. A wireless station according to claim 31, wherein said receiver comprises:

a code selector circuit that decodes the received signal according to respective codes of the set of codes to generate respective likelihood metrics associated with respective codes of the set of codes and that selects a code from the set of codes based on the respective likelihood metrics, wherein the selection of the code from the set of codes is biased based on a prior communication between the wireless station and the station that transmitted the signal; and a variable decoder that decodes the received signal according to the selected code to generate an estimate of the information.

33. A wireless station according to claim 32, wherein said code selector circuit is operative to bias the selection of a code from the set of codes based on at least one of a measure of channel quality, a communications status report, a state of a communications transaction between the wireless station and the station that transmitted the signal, and a previously selected code.

34. A wireless station according to claim 33, wherein the measure of channel quality comprises at least one of an error indication, a CRC check result, an error rate estimate, and a signal to noise ratio.

35. A wireless station according to claim 33, wherein the communications status report comprises an ARQ status message.

36. A wireless station according to claim 31, wherein a respective code of the set of codes comprises a respective combination of a modulation code and a channel code.

37. A wireless station for processing a signal representing a first field and a second field, the first field coded according to a code selected from a set of codes and the second field indicating the code applied to the first field, the wireless station comprising:

a code selector circuit that processes the signal to generate an estimate of the second field, and that is operative, responsive to a confidence in the generated estimate of the second field, to select the code applied to the first field based solely on the generated estimate of the second field or to select the code applied to the first field based on the generated estimate of the second field and respective likelihood metrics associated with decoding the received signal according to respective codes of the set of codes; and a variable decoder, responsive to said code selector circuit, that decodes the signal according to the selected code to produce an estimate of the first field.

38. A wireless station according to claim 37, wherein said code selector circuit is operative to decode the received signal according to respective codes of the set of codes and to generate respective likelihood metrics for the respective decodings of the received signal according to the respective codes of the set of codes.

39. A wireless station according to claim 38, wherein said code selector circuit is operative to decode the signal according to respective codes of the set of codes to an extent that is determined based on a confidence in the generated estimate of the second field.

40. A wireless station according to claim 39, wherein said code selector circuit is operative to decode the signal according to respective codes of the set of codes to an extent that is determined based on prior communication between the wireless station and a station that transmitted the signal.

41. A wireless station for processing a signal representing a first field and a second field, the first field coded according to a code selected from a set of codes and the second field indicating the code applied to the first field, the wireless station comprising:

a code selector circuit that processes the signal to generate an estimate of the second field, and that is operative, responsive to a confidence in the generated estimate of the second field, to select the code applied to the first field based solely on the generated estimate of the second field or to select the code applied to the first field based on the generated estimate of the second field and respective likelihood metrics associated with decoding the received signal according to respective codes of the set of codes, wherein said code selector circuit is operative to decode the received signal according to respective codes of the set of codes and to generate respective likelihood metrics for the respective decodings of the received signal according to the respective codes of the set of codes, wherein said code selector circuit is operative to decode the signal according to respective codes of the set of codes to an extent that is determined based on a confidence in the generated estimate of the second field, wherein said code selector circuit is operative to decode the signal according to respective codes of the set of codes to an extent that is determined based on prior communication between the wireless station and a station that transmitted the signal, and wherein said code selector circuit is operative to decode the signal according to respective codes of the set of codes to an extent that is determined based on at least one of a measure of channel quality, a communications status report transmitted between the wireless station and the station that transmitted the signal, an error indication, an error rate estimate, a state of a communications transaction between the wireless station and the station that transmitted the signal, and an extent to which a previously received signal was decoded; and a variable decoder, responsive to said code selector circuit, that decodes the signal according to the selected code to produce an estimate of the first field.

42. A wireless station according to claim 40, wherein said code selector circuit is operative to bias a selection of a code from the set of codes based on prior communication between the wireless station and the station that transmitted the signal.

43. A wireless station according to claim 42, wherein said code selector circuit is operative to bias a selection of a code from the set of codes based on at least one of a measure of channel quality, a communications status report transmitted between the wireless station and the station that transmitted the signal, an error indication, an error rate estimate, a state of a communications transaction between the first station and the second station, and a previously selected code.

44. A wireless station according to claim 43, wherein a respective code of the set of codes comprises a respective combination of a modulation code and a channel code.

45. A wireless station for processing a signal representing information coded according to a code selected from a set of codes, the wireless station comprising:

a receiver that receives the signal, that determines an extent to which to decode the received signal based on a communication between the wireless station and a station that transmitted the signal that occurred prior to reception of the signal, that decodes the received signal according to respective codes of the set of codes to the determined extent to generate respective likelihood metrics associated with respective codes of the set of codes, that selects a code from the set of codes based on the respective likelihood metrics, and that decodes the received signal according to the selected code to generate an estimate of the information.

46. A wireless station according to claim 45, wherein said receiver comprises: a code selector circuit that determines an extent to which to decode the received signal based on a prior communication between the wireless station and the station that transmitted the signal, that decodes the received signal according to respective codes of the set of codes to the determined extent to generate respective likelihood metrics associated with respective codes of the set of codes, and that selects a code from the set of codes based on the respective likelihood metrics; and
    a variable decoder, responsive to said code selector circuit, that decodes the received signal according to the selected code to generate an estimate of the information.

47. A wireless station for processing a signal representing information coded according to a code selected from a set of codes, the wireless station comprising:
    a receiver that receives the signal, that determines an extent to which to decode the received signal based on a communication between the wireless station and a station that transmitted the signal that occurred prior to reception of the signal, that decodes the received signal according to respective codes of the set of codes to the determined extent to generate respective likelihood metrics associated with respective codes of the set of codes, that selects a code from the set of codes based on the respective likelihood metrics, and that decodes the received signal according to the selected code to generate an estimate of the information, wherein said receiver comprises:
        a code selector circuit that determines an extent to which to decode the received signal based on a prior communication between the wireless station and the station that transmitted the signal, that decodes the received signal according to respective codes of the set of codes to the determined extent to generate respective likelihood metrics associated with respective codes of the set of codes, and that selects a code from the set of codes based on the respective likelihood metrics, wherein said code selector circuit is operative to determine the extent to which to decode the received signal based on at least one of a measure of channel quality, a communications status report transmitted between the wireless station and the station that transmitted the signal, an error indication, an error rate estimate, a state of a communications transaction between the wireless station and the station that transmitted the signal, and an extent to which a previously received signal was decoded; and
        a variable decoder, responsive to said code selector circuit, that decodes the received signal according to the selected code to generate an estimate of the information.

48. A wireless station according to claim 47, wherein the measure of channel quality comprises at least one of an error indication, a CRC check result, an error rate estimate, and a signal to noise ratio estimate.

49. A wireless station according to claim 47, wherein the communications status report comprises an ARQ status message.

50. A wireless station according to claim 47, wherein the signal represents a first field and a second field, wherein the first field is coded according to a code selected from a set of codes and the second field indicates the code applied to the first field, and wherein said code selector circuit is operative to process the received signal to generate an estimate of the second field and to determining the extent to which to decode the received signal based on a confidence in the generated estimate of the second field.

51. A wireless station for processing a signal representing information coded according to a code selected from a set of codes, the wireless station comprising:
    means for receiving the signal;
    means for decoding the received signal according to respective codes of the set of codes to generate respective likelihood metrics associated with respective codes of the set of codes;
    means for selecting a code from the set of codes based on the respective likelihood metrics, wherein the selection of the code from the set of codes is biased based on a communication between the wireless station and a station that transmitted the signal that occurred prior to reception of the signal; and
    means for decoding the received signal according to the selected code to generate an estimate of the information.

52. A wireless station according to claim 51, wherein said means for selecting a code from the set of codes comprises means for biasing a selection of a code from the set of codes based on at least one of a measure of channel quality, a communications status report, a state of a communications transaction between the wireless station and the station that transmitted the signal, and a previously selected code.

53. A wireless station according to claim 51, wherein the signal represents a first field and a second field, wherein the first field is coded according to a code selected from a set of codes and the second field indicates the code applied to the first field, and:
    wherein said means for selecting a code from the set of codes based on the respective likelihood metrics comprises:
        means for processing the received signal to generate an estimate of the second field; and
        means for selecting a code from the set of codes based on the respective likelihood metrics and the generated estimate of the second field; and
    wherein said means for decoding the received signal according to the selected code comprises means for decoding the received signal according to the selected code to generate an estimate of the first field.

54. A wireless station according to claim 51, wherein a respective code of the set of codes comprises a respective combination of a modulation code and a channel code.

55. A wireless station for processing a signal representing a first field and a second field, wherein the first field is coded according to a code selected from a set of codes and the second field indicates the code applied to the first field, the wireless station comprising:
    means for receiving the signal;
    means for processing the received signal to generate an estimate of the second field;
    means, responsive to a confidence in the generated estimate of the second field, for identifying the code applied to the first field based solely on the generated estimate of the second field or for identifying the code applied to the first field based on the generated estimate of the second field and respective likelihood metrics associated with decoding the received signal according to respective codes of the set of codes; and
    means for decoding the received signal according to the identified code to produce an estimate of the first field.

56. A wireless station according to claim 55:
    wherein said means for identifying the code applied to the first field based solely on the generated estimate of the second field or for identifying the code applied to the first field based on the generated estimate of the second field and respective likelihood metrics associated with decoding the received signal according to respective codes of the set of codes comprises:
means for decoding the received signal according to respective codes of the set of codes; and
means for generating respective likelihood metrics for the respective decodings of the received signal according to the respective codes of the set of codes.

57. A wireless station according to claim 56, wherein said means for decoding the received signal according to respective codes of the set of codes comprises means for decoding the received signal according to respective codes of the set of codes to an extent that is determined based on a confidence in the generated estimate of the second field.

58. A wireless station according to claim 56, wherein said means for decoding the received signal according to respective codes of the set of codes comprises means for decoding the received signal according to respective codes of the set of codes to an extent that is determined based on prior communication between the wireless station and a station that transmitted the signal.

59. A wireless station according to claim 58, wherein said means for decoding the received signal according to respective codes of the set of codes to an extent that is determined based on prior communication comprises means for decoding the received signal according to respective codes of the set of codes to an extent that is determined based on at least one of a measure of channel quality, a communications status report transmitted between the wireless station and the station that transmitted the signal, an error indication, an error rate estimate, a state of a communications transaction between the wireless station and the station that transmitted the signal, and an extent to which a previously received signal was decoded.

60. A wireless station according to claim 55, wherein said means for identifying the code applied to the first field based solely on the generated estimate of the second field or for identifying the code applied to the first field based on the generated estimate of the second field and respective likelihood metrics associated with decoding the received signal according to respective codes of the set of codes comprises means for biasing a selection of a code from the set of codes based on prior communication between the wireless station and the station that transmitted the signal.

61. A wireless station for processing a signal representing a first field and a second field, wherein the first field is coded according to a code selected from a set of codes and the second field indicates the code applied to the first field, the wireless station comprising:
means for receiving the signal;
means for processing the received signal to generate an estimate of the second field;
means, responsive to a confidence in the generated estimate of the second field, for identifying the code applied to the first field based solely on the generated estimate of the second field or for identifying the code applied to the first field based on the generated estimate of the second field and respective likelihood metrics associated with decoding the received signal according to respective codes of the set of codes, wherein said means for identifying the code applied to the first field based solely on the generated estimate of the second field or for identifying the code applied to the first field based on the generated estimate of the second field and respective likelihood metrics associated with decoding the received signal according to respective codes of the set of codes comprises means for biasing a selection of a code from the set of codes based on prior communication between the wireless station and the station that transmitted the signal, and wherein said means for biasing a selection of a code from the set of codes comprises means for biasing the selection of a code from the set of codes based on at least one of a measure of channel quality, a communications status report transmitted between the wireless station and the station that transmitted the signal, an error indication, an error rate estimate, a state of a communications transaction between the wireless station and the station that transmitted the signal, and an extent to which a previously received signal was decoded; and
means for decoding the received signal according to the identified code to produce an estimate of the first field.

62. A wireless station according to claim 55, wherein a respective code of the set of codes comprises a respective combination of a modulation code and a channel code.

63. A wireless station for processing a signal representing information coded according to a code selected from a set of codes, the wireless station comprising:
means for receiving the signal;
means for determining an extent to which to decode the received signal based on a communication between the wireless station and a station that transmitted the signal that occurred prior to reception of the signal;
means for decoding the received signal according to respective codes of the set of codes to the determined extent to generate respective likelihood metrics associated with respective codes of the set of codes;
means for selecting a code from the set of codes based on the respective likelihood metrics; and
means for decoding the received signal according to the selected code to generate an estimate of the information.

64. A wireless station according to claim 63, wherein the means for determining an extent comprises means for determining the extent to which to decode the received signal based on at least one of:
a measure of channel quality;
a communications status report;
a state of a communications transaction between the wireless station and the station that transmitted the signal; and
an extent to which a previously received signal was decoded.

65. A wireless station according to claim 63, wherein the signal represents a first field and a second field, wherein the first field is coded according to a code selected from a set of codes and the second field indicates the code applied to the first field, and:
wherein said means for determining an extent to which to decode the received signal comprises:
means for processing the received signal to generate an estimate of the second field; and
means for determining the extent to which to decode the received signal based on a confidence in the generated estimate of the second field; and
wherein said means for decoding the received signal according to the selected code to generate an estimate of the information comprises means for decoding the received signal according to the selected code to generate an estimate of the first field.

* * * * *